United States Patent
Yamazaki et al.

(10) Patent No.: US 6,646,692 B2
(45) Date of Patent: Nov. 11, 2003

(54) LIQUID-CRYSTAL DISPLAY DEVICE AND METHOD OF FABRICATING THE SAME

(75) Inventors: Shunpei Yamazaki, Tokyo (JP); Jun Koyama, Kanagawa (JP)

(73) Assignee: Semiconductor Energy Laboratory Co., Ltd., Kanagawa (JP)

( * ) Notice: Subject to any disclaimer, the term of this patent is extended or adjusted under 35 U.S.C. 154(b) by 263 days.

(21) Appl. No.: 09/769,767

(22) Filed: Jan. 26, 2001

(65) Prior Publication Data

US 2002/0008797 A1 Jan. 24, 2002

(30) Foreign Application Priority Data

Jan. 26, 2001 (JP) ..................... 2000-017636

(51) Int. Cl.[7] ........................................ G02R 1/1336
(52) U.S. Cl. ........................................ 349/47; 349/141
(58) Field of Search ................................ 349/141, 47

(56) References Cited

U.S. PATENT DOCUMENTS 5,892,562 A * 4/1999 Yamazaki et al. ........... 349/141
5,977,562 A * 11/1999 Hirakata et al. ............... 257/72
6,031,290 A   2/2000 Miyazaki et al.

FOREIGN PATENT DOCUMENTS

| JP | 6-148685 | 5/1994 |
| JP | 7-235680 | 9/1995 |
| JP | 8-274336 | 10/1996 |

* cited by examiner

Primary Examiner—James Dudek
(74) Attorney, Agent, or Firm—Fish & Richardson P.C.

(57) ABSTRACT

An active matrix type liquid-crystal display device of IPS mode has its aperture ratio enhanced, thereby to realize an image display which has a wide angle of vision and which is clear and bright. A pixel portion (in FIG. 2) in the liquid-crystal display device comprises a TFT (115) which includes a semiconductor film formed over a substrate, and gate electrodes formed on a first insulating layer, a gate wiring line (104) which is formed on the first insulating layer, a common wiring line (113) which crosses the gate wiring line (104) through a second insulating layer, a pixel electrode (112) which is formed on the second insulating layer and which is connected with the TFT (115) of the pixel portion, a signal wiring line (106) which is formed so as to underlie the common wiring line (113) through the second insulating layer, and a connecting electrode (111) which is formed on the second insulating layer. The pixel electrode (112) and the common wiring line (113) are arranged so as to generate an electric field parallel to the plane of the substrate, and the signal wiring line (106) and the semiconductor film are connected through the connecting electrode (111).

26 Claims, 22 Drawing Sheets

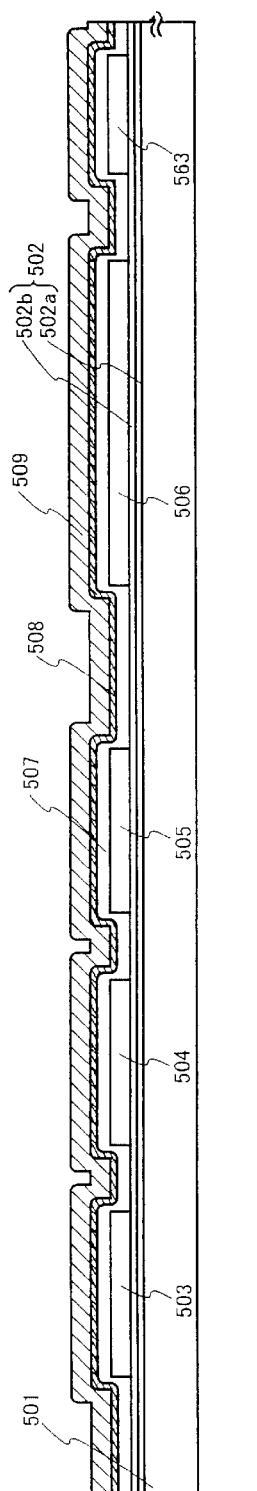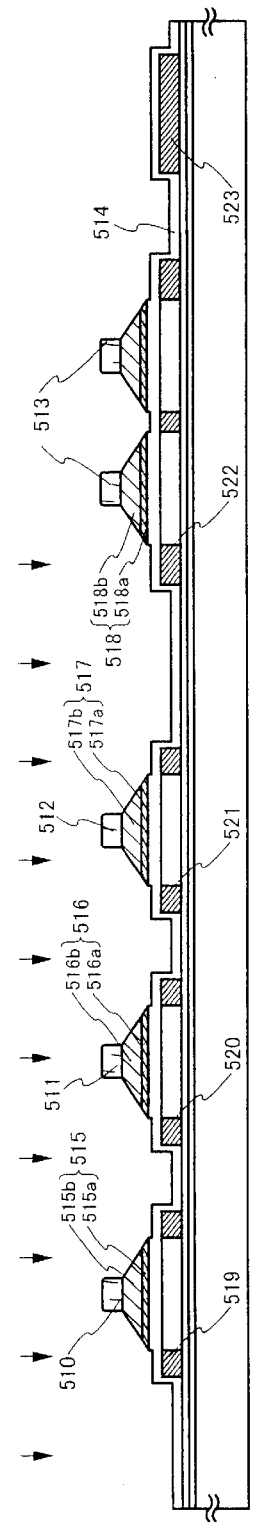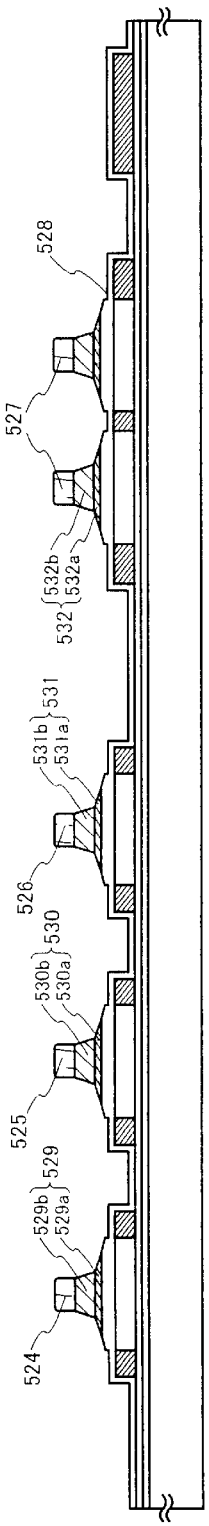

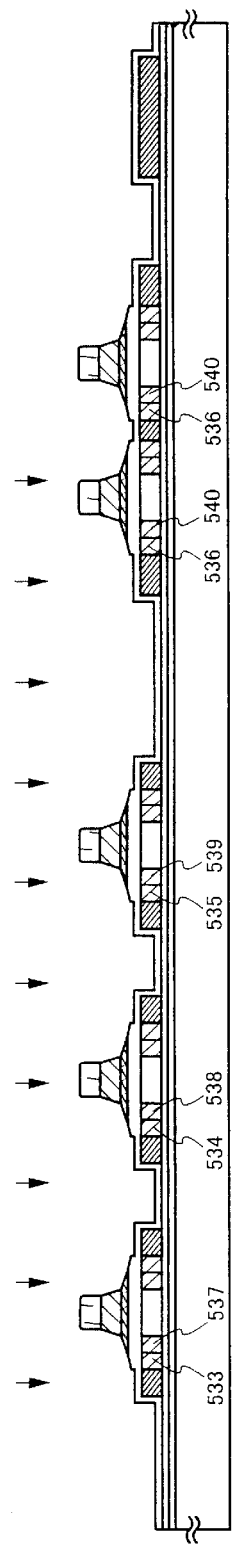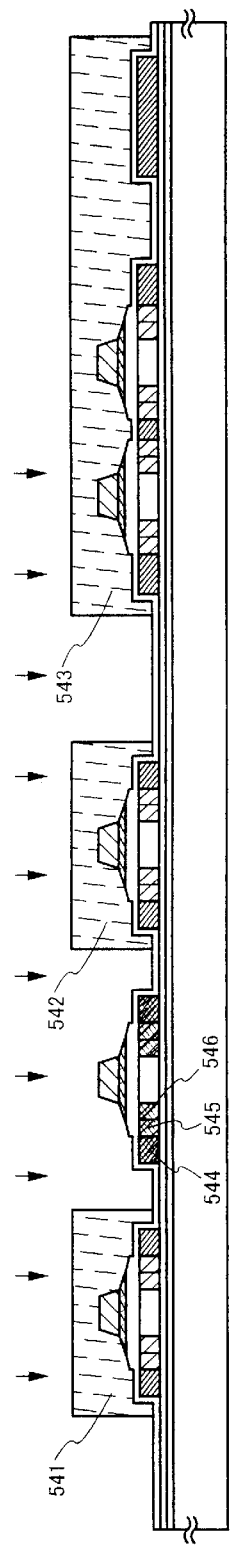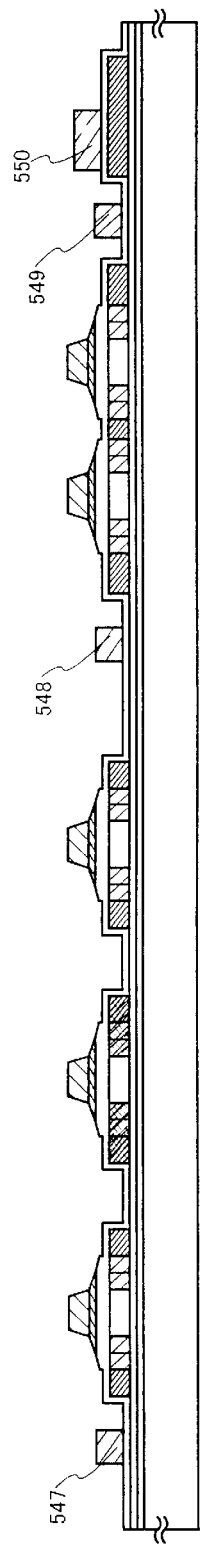

Fgi. 16

LIQUID-CRYSTAL DISPLAY DEVICE AND METHOD OF FABRICATING THE SAME

BACKGROUND OF THE INVENTION

1. Field of the Invention

The present invention relates to a liquid-crystal display device of active matrix type, and more particularly to an active matrix type liquid-crystal display device of IPS (In-Plane Switching) mode (horizontal electric field mode).

2. Description of the Related Art

There has been known a liquid-crystal display device of active matrix type employing active elements such as thin film transistors (TFTs). The active matrix type liquid-crystal display device is capable of heightening a pixel density, and it is small in size and light in weight and is of low dissipation power, so that the monitor of a personal computer, the display panel of a liquid-crystal television set, and the like products have been developed as substitutes for CRTs. In particular, a technique in which the active layer of each TFT is formed of a film of crystalline semiconductor typified by polycrystal silicon, permits the switching TFTs of pixel portions (hereinbelow, expressed as "pixel TFTs") and driver circuits to be formed on an identical substrate, and it is regarded as a technique which contributes to reducing the size and lightening the weight of the liquid-crystal display device.

The liquid-crystal display device is such that a liquid crystal is enclosed between a pair of substrates, and that liquid crystal molecules are oriented by electric fields which are substantially perpendicular to the planes of the substrates and which are applied across the pixel electrodes (individual electrodes) of one of the substrates and the counter electrode (common electrode) of the other substrate. Such a method of driving the liquid crystal, however, has had the disadvantage of a narrow angle of vision due to which, even in a normal display state as viewed in a direction perpendicular to the substrate planes, an image viewed obliquely becomes an unclear one involving changes in color tones.

An expedient for overcoming the disadvantage is the IPS mode. This mode features that pixel electrodes and a common wiring line are both formed on one substrate, and that electric fields are switched in a horizontal direction. Thus, liquid crystal molecules have their orientations controlled in a direction substantially parallel to the plane of the substrate without rising up. The angle of vision can be widened by the operating principle.

FIG. 5 shows an example of a pixel structure in an active matrix type liquid-crystal display device of IPS mode in the prior art. Referring to the figure, numeral 301 designates a gate wiring line, numeral 302 the semiconductor film of a TFT, numeral 303 a common wiring line, each of numerals 304 and 308 a signal wiring line (source wiring line), numeral 305 a pixel electrode, numeral 307 a counter electrode, and numeral 306 a storage capacitor portion.

With the pixel structure, gaps exist between the counter electrode 307 and the signal wiring lines 304, 308, and a liquid crystal cannot be driven in accordance with an image signal at the parts of the gaps as well as the signal wiring lines 304, 308, so that the problem of light leakages occurs. Light shield films need to be formed at the parts in order to prevent the light leakage, but they result in lowering the aperture ratio of a pixel portion. With the pixel structure as shown in FIG. 5, the aperture ratio is limited to at most 30–40% or so, and the intensity of back light needs to be heightened in order to ensure brightness. However, when the intensity of the back light is heightened, increase in dissipation power is incurred, and moreover, the lifetime of the back light itself might be shortened.

SUMMARY OF THE INVENTION

Although an active matrix type liquid-crystal display device of IPS mode can widen the angle of vision, it has the disadvantage of low aperture ratio. The present invention provides means for solving such a problem, and has for its object to enhance the aperture ratio of the active matrix type liquid-crystal display device of IPS mode, thereby to realize an image display which has a wide angle of vision and which is clear and bright.

A liquid-crystal display device of active matrix type which employs an IPS mode in a pixel portion, and which is intended to enhance an aperture ratio, is characterized by comprising a substrate which has an insulating surface; an insular semiconductor film (a semiconductor island), a gate wiring line, a pixel electrode, and a common wiring line which are formed over the insulating surface; a first insulating layer which is formed on said semiconductor film, and on which said gate wiring line is formed; a signal wiring line which is formed on said first insulating layer; a second insulating layer which is formed on said first insulating layer, and on which said pixel electrode and said common electrode are formed; and a connecting electrode which is formed on said second insulating layer, and through which said signal wiring line and said semiconductor film are connected; said pixel electrode and said common wiring line being arranged so as to generate an electric field parallel to the insulating substrate surface; said common electrode and said signal wiring line being arranged so as to lie one over the other through said second insulating layer.

Alternatively, a liquid-crystal display device is characterized by comprising a pixel portion and a driver circuit which are provided on an insulating surface of a substrate; said pixel portion including a TFT which includes a semiconductor film formed on the insulating surface, and a gate electrode and a gate wiring line formed on a first insulating layer formed on said insulating surface; a common wiring line which crosses said gate wiring line through a second insulating layer formed on said first insulating layer; a pixel electrode which is formed on the second insulating layer, and which is connected to said TFT; a signal wiring line which is formed on said first insulating layer so as to lie under said common wiring line through said second insulating layer; and a connecting electrode which is formed on said second insulating layer, and through which said signal wiring line and said semiconductor film are connected; said TFT of said pixel portion being disposed in correspondence with a point of intersection between said gate wiring line and said common wiring line; said pixel electrode and said common wiring line being arranged so as to generate an electric field parallel to a plane of the substrate. Further, another substrate includes color filter layers of red, blue and green which are formed on a surface of the other substrate, and which correspond to each pixel of said pixel portion; a light shield film which is disposed so as to lie over said TFT of said pixel portion, and which is formed of the red color filter layer or in which the red color filter layer and the blue color filter layer are stacked.

Besides, in order to solve the above problem, a method of fabricating a liquid-crystal display device according to the present invention is characterized by comprising the first step of preparing a substrate; the second step of overlaying the substrate with an insular semiconductor film formed of a crystalline semiconductor film; the third step of forming a first insulating layer on the insular semiconductor film; the fourth step of forming a gate wiring line and a signal wiring line on the first insulating layer; the fifth step of forming a second insulating layer on the gate wiring line and the signal wiring line; and the sixth step of overlaying the second insulating layer with a pixel electrode, a common wiring line, and a connecting electrode for connecting said signal wiring line and said semiconductor film, the common wiring line being arranged so as to lie over said signal wiring line.

Alternatively, a method of fabricating a liquid-crystal display device is characterized by comprising the first step of preparing a pair of substrates; the second step of overlaying one of the substrates with an insular semiconductor film formed of a crystalline semiconductor film; the third step of forming a first insulating layer on the insular semiconductor film; the fourth step of forming a gate electrode, a gate wiring line and a signal wiring line on the first insulating layer; the fifth step of forming a second insulating layer on the gate wiring line and the signal wiring line; the sixth step of overlaying the second insulating layer with a pixel electrode connected to said semiconductor film, a common wiring line, and a connecting electrode for connecting said signal wiring line and said semiconductor film, the common wiring line being arranged so as to lie over said signal wiring line; the seventh step of overlaying a surface of the other of said pair of substrates with color filter layers of red, blue and green corresponding to each pixel formed on said one substrate; the eighth step of forming a light shield film by stacking the red color filter layer and the blue color filter layer, so as to lie over, at least, the thin semiconductor film; and the ninth step of forming a light-transmitting conductive film on a surface of said other substrate opposite to the surface formed with said color filter layers.

BRIEF DESCRIPTION OF THE DRAWINGS

FIGS. 6A through 6C are sectional views for explaining the fabricating steps of a pixel TFT and the TFTs of a driver circuit;

FIGS. 7A through 7C are sectional views for explaining the fabricating steps of the pixel TFT and the TFTs of the driver circuit;

DETAILED DESCRIPTION OF THE INVENTION

Aspect of Performance 1

The pixel portion of an active matrix type liquid-crystal display device of IPS mode is constructed of a pixel TFT formed of a p-channel or n-channel TFT, a pixel electrode, a storage capacitor, a signal wiring line, a common wiring line, etc. The present invention is characterized especially by the shapes of the signal wiring line and the common wiring line. The construction of the pixel portion according to the present invention will be described with reference to FIGS. 1–3 below.

Figure 1:
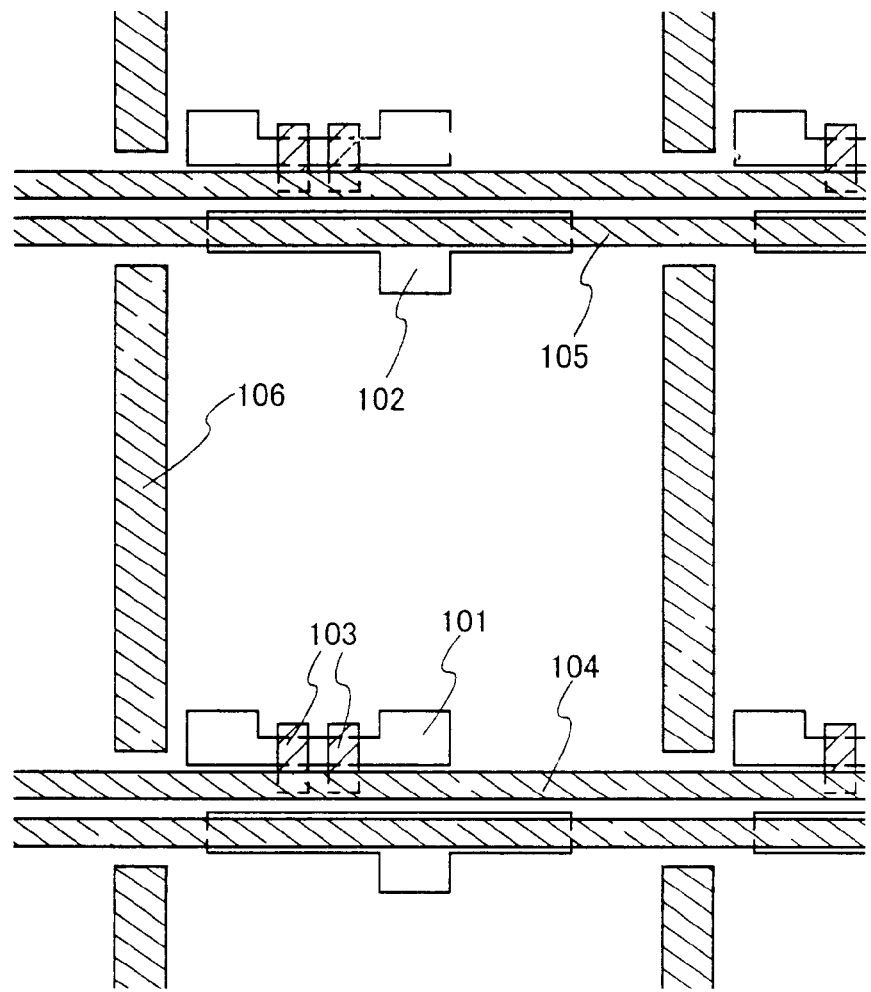
FIG. 1 is a top view showing a process for fabricating a pixel portion in an aspect of performance of the present invention.

FIG. 1 illustrates the state which corresponds substantially to one pixel of a pixel portion, and in which insular semiconductor films 101, 102, gate electrodes 103, a gate wiring line 104 and a signal line 106 are formed on an insulating surface. A substrate bearing the insulating surface should preferably be any of a non-alkaline glass substrate, a quartz substrate, etc., and a plastics substrate is alternatively usable. The insular semiconductor film 101 is provided in order to form the channel forming region, source and drain regions, LDD regions, etc. of a TFT, while the insular semiconductor film 102 is provided in order to form a storage capacitor. Although not shown, a first insulating film (corresponding to gate insulating films) is deposited on the insular semiconductor films 101, 102 and at least the part of the substrate forming the pixel portion, and it is overlaid with the gate electrodes 103. Each of the gate electrodes 103 is formed of an element selected from the group consisting of tungsten W, tantalum (Ta), titanium (Ti) and molybdenum (Mo), or an alloy material containing the element. Alternatively, it may well be formed in combination with a film of polycrystal silicon or a film of the silicide of the element.

The gate wiring line 104 and a capacitor wiring line 105 may well be formed of the same material as that of the gate electrodes 103. However, the material has a sheet resistance of 10 Ω/□ or above, and it is not always appropriate in case of fabricating a liquid-crystal display device whose screen size is in the 4-inch class or above. With the enlargement of a screen size, the lengths of wiring lines increase to the extent that the delay time (wiring delay) of a signal attributed to the influence of a wiring resistance becomes unnegligible. By way of example, the length of a diagonal line is 340 mm in the 13-inch class, and it is 460 mm in the 18-inch class. Accordingly, the gate wiring line 104 and the capacitor wiring line 105 should desirably be formed of a material whose main component is aluminum (Al) or copper (Cu) exhibiting a low sheet resistance.

In a case where the gate wiring line 104 is formed of the material different from that of the gate electrodes 103, the contact portions thereof are provided outside the insular semiconductor film 101 as shown in FIG. 1. Since the element Al sometimes diffuses out into the gate insulating films on the basis of electromigration etc., it is inappropriate to lay the Al gate wiring line 104 on the insular semiconductor film 101 in direct contact with the gate insulating films. The gate electrodes 103 and the gate wiring line 104 require no contact holes for their contacts, and they are formed so as to overlap each other. Besides, the signal wiring line 106 is formed simultaneously with the gate wiring line 104.

Figure 2:
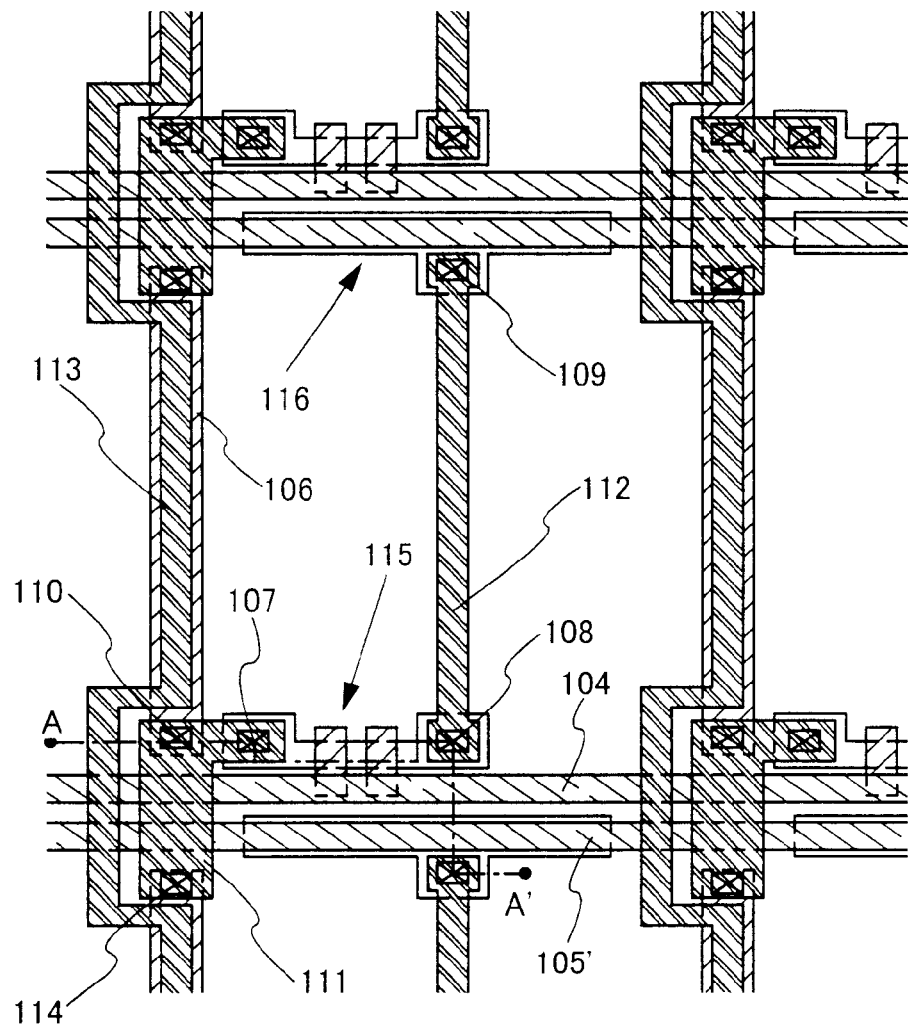
FIG. 2 is a top view showing the process for fabricating the pixel portion in the aspect of performance of the present invention.

Thereafter, an interlayer insulating film (not shown) is formed, and a pixel electrode 112, a common wiring line 113 and a connecting electrode 111 are formed as shown in FIG. 2. The pixel electrode 112 is connected with the insular semiconductor film 101 by a contact portion 108 provided in the interlayer insulating film. The corresponding part of the insular semiconductor film 101 is a region which is formed with a source or drain doped with an n-type or p-type impurity element. One end of the pixel electrode 112 is connected with the insular semiconductor film 102 by a contact portion 109.

The connecting electrode 111 connects the signal wiring line 106 and the insular semiconductor film 101 through contact portions 110, 107, and it is connected with the signal wiring line of an adjacent pixel by a contact portion 114. That is, according to the aspect of performance of the present invention, the signal wiring lines and the gate wiring lines are formed on the identical layer, and they are crossed using the connecting electrodes formed on the interlayer insulating film.

As shown in FIG. 2, the common wiring line 113 is formed on the interlayer insulating film and is laid so as to overlap the signal wiring line 106. The common wiring line and the signal wiring lines are formed so as to overlap each other in this manner, thereby to incarnate enhancement in the aperture ratio of the pixel portion of that active matrix type liquid-crystal display device of the IPS mode which is constructed as a transmission type.

Figure 3:
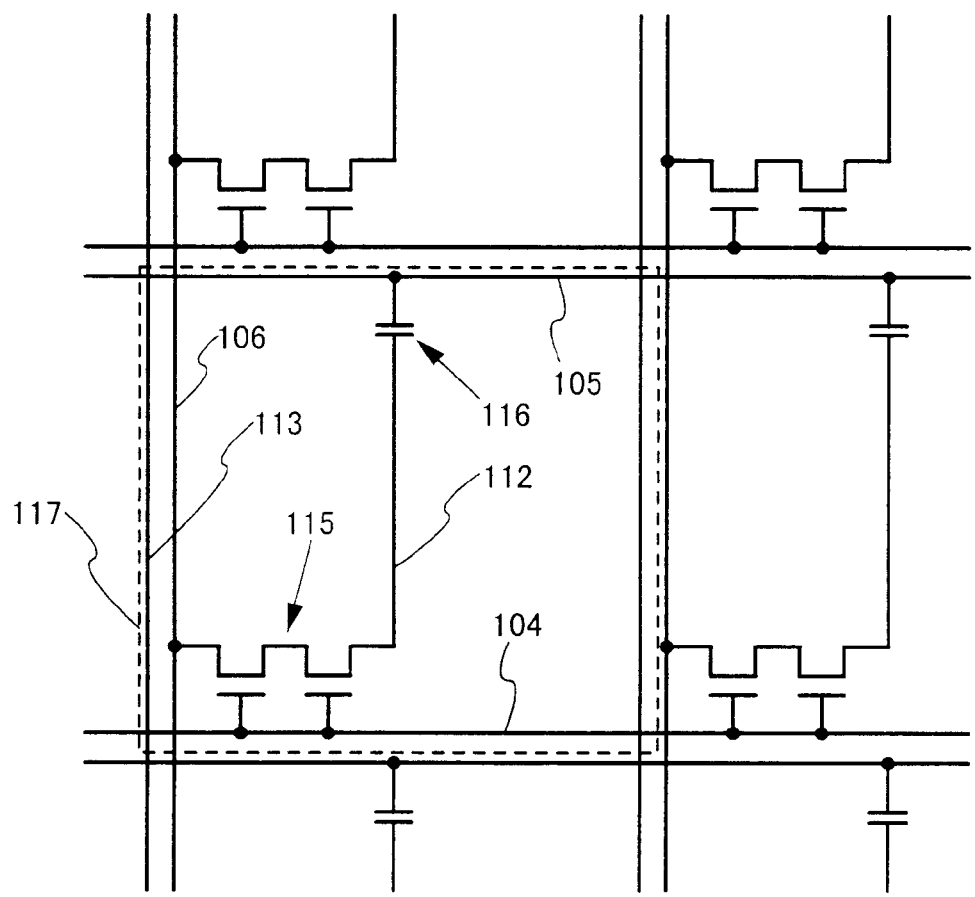
FIG. 3 is a circuit diagram showing the circuit connection of the pixel portion in the aspect of performance of the present invention.

Thus, the pixel TFT 115 and the storage capacitor 116 are formed. The pixel TFT 115 is exemplified in FIG. 2 as the multi-gate structure in which the two gate electrodes are provided between the pair of sources and drains, but the number of gate electrodes is not restricted, and a pixel TFT may well be formed as a single-gate structure. The storage capacitor 116 is formed of the semiconductor film 102, an insulating film (not shown) lying at the same layer as that of the gate insulating films, and the capacitor wiring line 105. FIG. 3 shows a circuit diagram of the pixel portion, and a part enclosed with a dotted line 117 corresponds substantially to one pixel.

The width of the pixel electrode 112 should desirably be at least 3 μm in consideration of the spread of an electric field in a direction parallel to the plane of the substrate. Besides, the interval between the pixel electrode 112 and the common wiring line 113 should be set at 10–20 μm, preferably 12–14 μm. Although the basic pixel construction of the IPS mode according to the present invention is illustrated in FIGS. 1 and 2, a pixel electrode and a common wiring may well be formed in an interdigitated shape in consideration of the size of one pixel and the visibility of an image.

Figure 17:
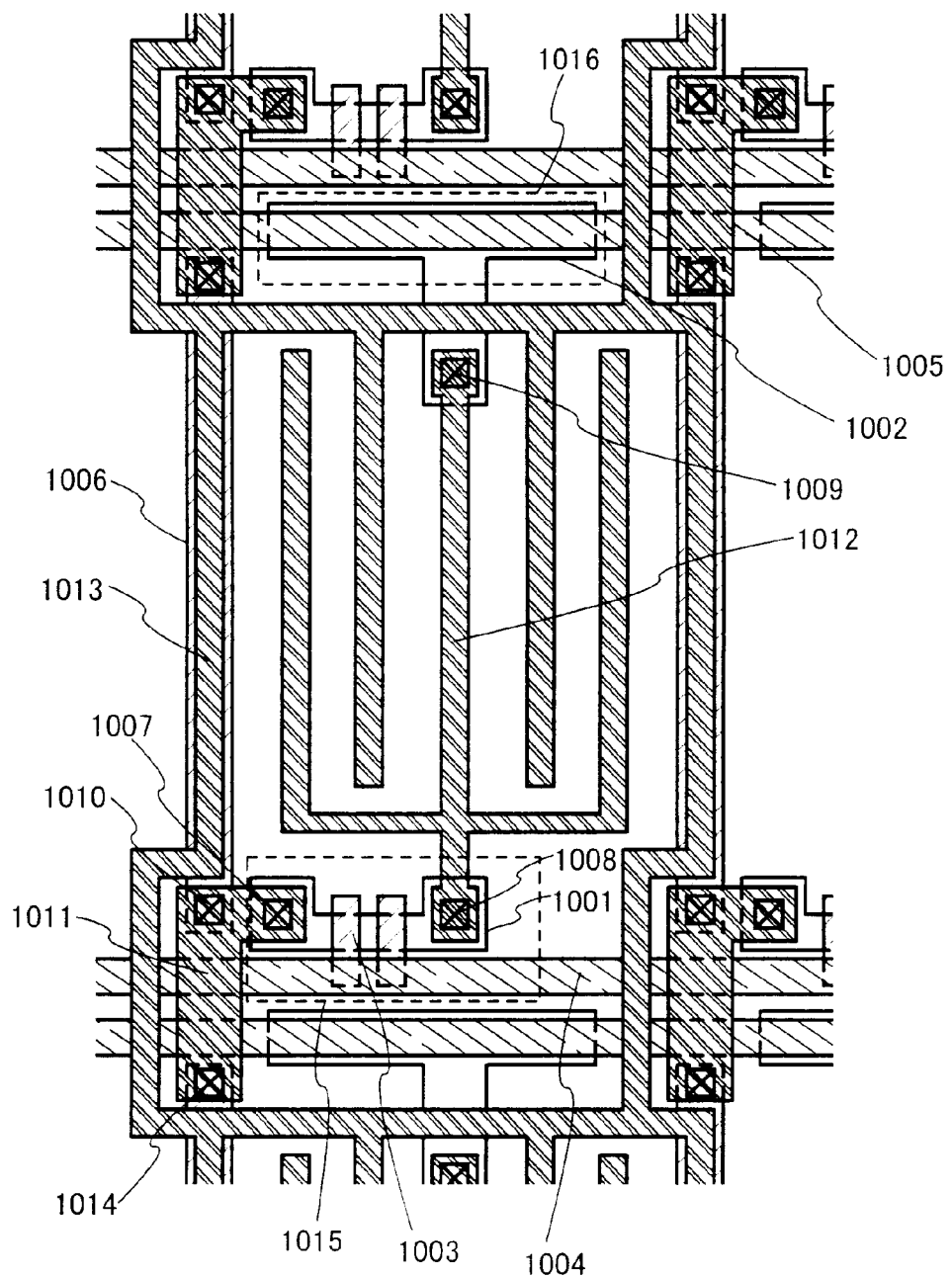
FIG. 17 is a top view showing a pixel portion in still another aspect of performance of the present invention.

FIG. 17 shows such an example, in which a pixel TFT 1015, a storage capacitor 1016, the pixel electrode 1012 and the common electrode (common wiring line) 1013 are provided. The pixel TFT 1015 is formed of an insular semiconductor film 1001, gate electrodes 1003, etc., and it is connected with the pixel electrode 1012 by a contact portion 1008. A signal wiring line 1006 is connected with a connecting wiring line 1011 by a contact portion 1010. The connecting wiring line 1011 is connected with the insular semiconductor film 1001 by a contact portion 1007, and with the signal wiring line of an adjacent pixel by a contact portion 1014. The common wiring line 1013 is laid so as to overlap the signal wiring line 1006 with an interlayer insulating film interposed therebetween.

In the pixel structure shown in FIG. 2 or FIG. 17, the signal wiring line and the common wiring line are laid so as to overlap each other through the interlayer insulating film, so that light shield films for covering these wiring line portions need not always be provided. Accordingly, an area in which transmitted light is intercepted can be decreased in the liquid-crystal display device of the transmission type, and the aperture ratio of this device can be enhanced to 50–60%. As a result, power which is dissipated by back light can be made lower than in the liquid-crystal display device of the IPS mode in the prior art.

Aspect of Performance 2

Figure 4:
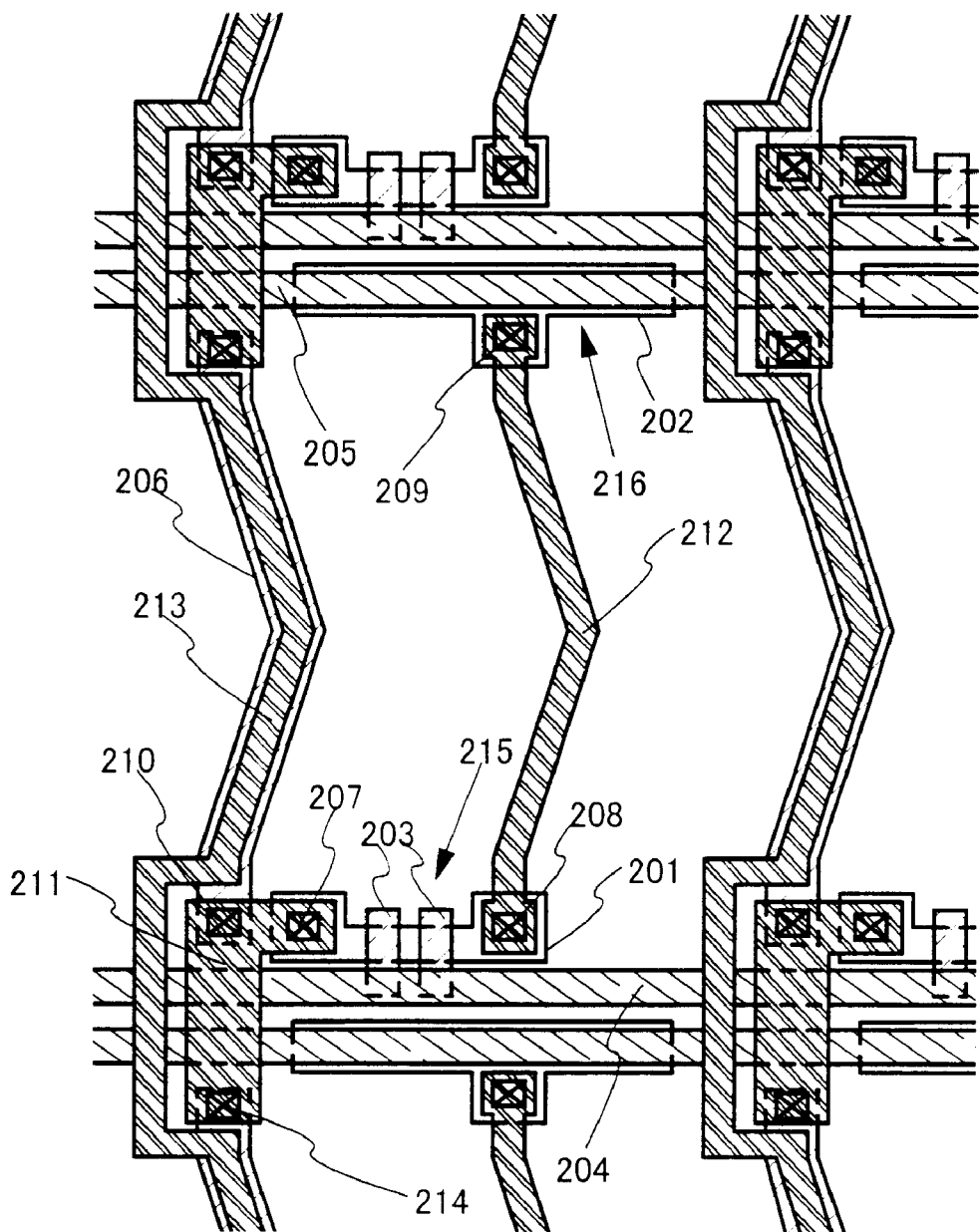
FIG. 4 is a top view showing a pixel portion in another aspect of performance of the present invention.
Figure 5:
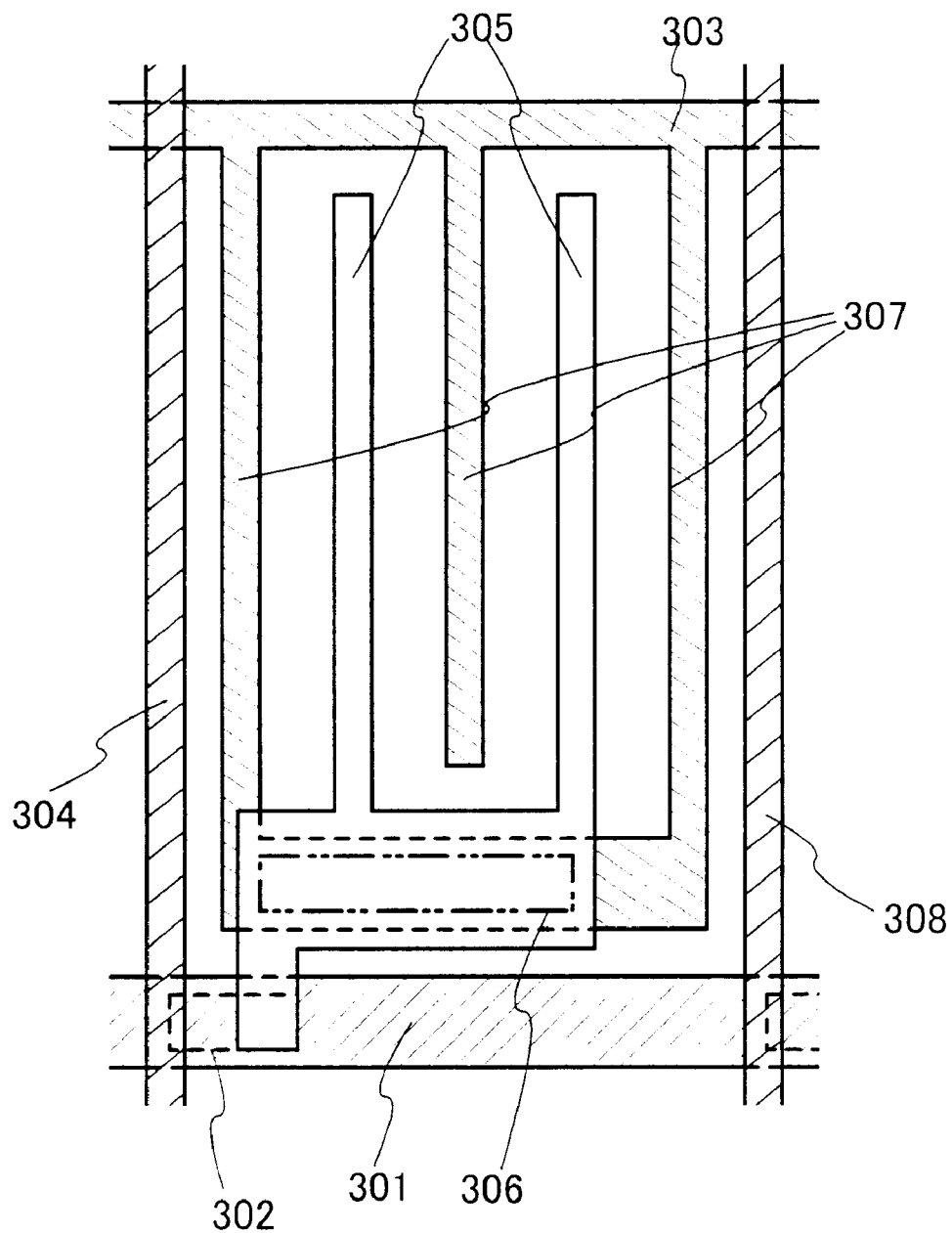
FIG. 5 is a top view for explaining the structure of a pixel portion which conforms to an IPS mode in the prior art.

Regarding the IPS mode, an electrode structure of dog-leg shape has been known as an expedient for widening the angle of vision with the color tone of white included. FIG. 4 shows an example in which the dog-legged electrode structure is adopted in the pixel structure of the present invention described in Aspect of Performance 1. A pixel is constructed of a pixel TFT 215, a storage capacitor 216, a pixel electrode 212 and a common electrode 213. The pixel TFT 215 is formed of an insular semiconductor film 201, gate electrodes 203, etc., and it is connected with the pixel electrode 212 by a contact portion 208. A signal wiring line 206 is connected with a connecting wiring line 211 by a contact portion 210. The connecting wiring line 211 is connected with the insular semiconductor film 201 by a contact portion 207, and with the signal wiring line of an adjacent pixel by a contact portion 214. The common wiring line 213 is laid so as to overlap the signal wiring line 206 with an interlayer insulating film interposed therebetween, and the narrower angle of the dog-leg shape is set at 120–160 degrees, preferably 150 degrees. When the dog-legged electrode structure is adopted, the angle of vision of an image display is widened still further. More specifically, changes in color tones are not noted, and degradation in contrast can be lessened, when the image display is viewed, not only in a direction perpendicular to a substrate plane, but also in a direction inclined an angle of about 60–50 degrees.

Aspect of Performance 2

Figure 18A:
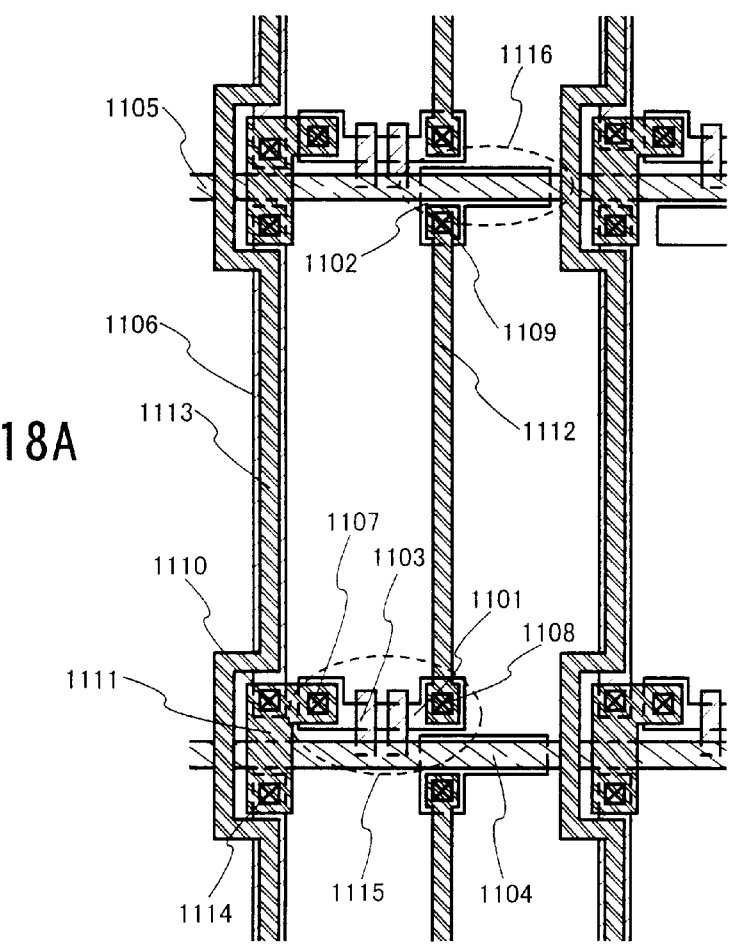
FIGS. 18A and 18B are a top view and a circuit diagram showing a pixel portion in yet another aspect of performance of the present invention, respectively.
Figure 18B:
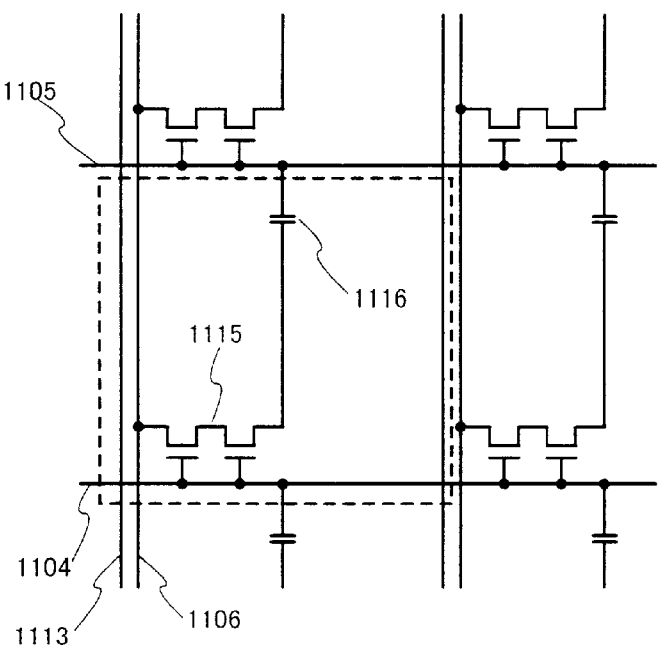

FIG. 18A shows another example of the pixel structure of the IPS mode. A pixel is constructed of a pixel TFT 1115, a storage capacitor 1116, a pixel electrode 1112 and a common electrode 1113. The pixel TFT 1115 is formed of an insular semiconductor film 1101, gate electrodes 1103, etc., and it is connected with the pixel electrode 1112 by a contact portion 1108. A signal wiring line 1106 is connected with a connecting wiring line 1111 by a contact portion 1110. The connecting wiring line 1111 is connected with the insular semiconductor film 1101 by a contact portion 1107, and with the signal wiring line of an adjacent pixel by a contact portion 1114. The common wiring line 1113 is laid so as to overlap the signal wiring line 1106 with an interlayer insulating film interposed therebetween. A circuit diagram of such a pixel is shown in FIG. 18B.

One electrode of the storage capacitor 1116 is formed of a semiconductor film 1102 which is doped with an impurity element of p-type typified by boron, while the other electrode thereof is formed of that gate wiring line 1105 of another adjacent pixel which overlaps the semiconductor film 1102 through an insulating film formed at the same layer as that of gate insulating films. The reason why the semiconductor film 1102 is endowed with the p-conductivity type, is that the pixel TFT 1115 is brought into an ON state when the gate wiring line 1105 is at a LOW level.

With the pixel structure as shown in FIG. 18A, it is permitted to omit a capacitor wiring line. Accordingly, the circuit arrangement of a liquid-crystal display device including the pixel portion and driver circuits can be simplified, and the aperture ratio thereof can be enhanced still further.

The preferred embodiments of the present invention will now be described.

Embodiment 1

In this embodiment, there will be described in detail a method in which a pixel portion conforming to a pixel structure of IPS mode, and the TFTs of a driver circuit lying around the pixel portion are fabricated simultaneously.

The gate electrode of each of the TFTs mentioned in this embodiment has a double-layer structure. The first layer and second layer of the double-layer structure are both formed of an element which is selected from the group consisting of Ta, W, Ti and Mo, or an alloy material or compound material which contains the element as its main component. Alternatively, the first layer may well be formed of a semiconductor film which is typified by a polycrystal silicon film doped with an impurity element such as phosphorus. As an example of a preferable combination, the first layer is formed of Ta or tantalum nitride (TaN), or a stacked structure of tantalum nitride (TaN) and Ta, while the second layer is formed of W.

Although the same holds true also of the semiconductor film employed for the first layer of the gate electrode, the element selected from the group consisting of Ta, W, Ti and Mo, or the alloy material or compound material containing the element as its main component has a sheet resistance of about 10 Ω/□ or above, and it is not always suitable in case of fabricating a display device whose screen size is in the 4-inch class or above. With the enlargement of a screen size, the lengths of wiring lines to be laid over a substrate increase inevitably, so that the problem of the delay time of a signal attributed to the influence of a wiring resistance becomes unnegligible. In this regard, when the widths of the wiring lines are enlarged for the purpose of lowering the wiring resistance, the areas of surrounding regions other than the pixel portion increase to drastically spoil the external appearance of the display device.

First, as shown in FIG. 6A, a subbing film 502 made of an insulating film such as a silicon oxide film, a silicon nitride film or a silicon oxynitride film, is formed on a substrate 501 made of glass such as barium borosilicate glass or aluminoborosilicate glass which is typified by, for example, Glass #7059 or Glass #1737 manufactured by Corning Incorporated. By way of example, a silicon oxynitride film 502a prepared from $SiH_4$, and $NH_3$ and $N_2O$ by plasma CVD is formed to a thickness of 10–200 nm (preferably, 50–100 nm), and a silicon oxynitride film 502b similarly prepared from $SiH_4$ and $N_2O$ is stacked on the film 502a to a thickness of 50–200 nm (preferably, 100–150 nm). Although the subbing film 502 is illustrated as a double-layer structure in this embodiment, it may well be formed of a single-layer film formed of the insulating film, or a structure in which three or more layers are stacked.

Insular semiconductor layers 503–506 and 563 on the resulting insulating surface are formed of crystalline semiconductor films prepared in such a way that a semiconductor film having an amorphous structure is treated by laser crystallization or thermal crystallization. The thickness of each of the insular semiconductor layers 503–506 and 563 is set at 25–80 nm (preferably, 30–60 nm). Although the material of the crystalline semiconductor films is not especially restricted, it should preferably be silicon, a silicon-germanium (Si—Ge) alloy, or the like.

In preparing the crystalline semiconductor films by the laser crystallization, it is possible to employ a gas laser typified by excimer laser or a solid laser typified by YAG laser or $YVO_4$ laser as is of pulsed lasing type or continuous emission type. In case of employing such a laser, a method is recommended wherein a laser beam emitted from a laser oscillator is condensed into the shape of a line or a rectangle by an optical system so as to irradiate the amorphous semiconductor film. The conditions of the crystallization shall be properly chosen by a person who controls the treatment. However, in the case of employing the excimer laser, it is allowed to set a pulsed lasing frequency at 30 Hz and a laser energy density at 100–400 $mJ/cm^2$ (typically, 200–300 $mJ/cm^2$). Besides, in the case of employing the YAG laser, it is allowed to utilize the second higher harmonics of the emitted laser beam and to set a pulsed lasing frequency at 1–10 kHz and a laser energy density at 300–600 $mJ/cm^2$ (typically, 350–500 $mJ/cm^2$). Herein, the whole surface of the substrate is irradiated with the laser beam condensed in the shape of the line having a width of 100–1000 μm, for example, 400 μm, and the overlap percentage of such rectilinear laser beams on this occasion is set at 80–98%.

A gate insulating film 507 is formed of an insulating film containing silicon, at a thickness of 40–150 nm by employing plasma CVD or sputtering. In this embodiment, it is formed of a silicon oxynitride film at a thickness of 120 nm. Of course, the gate insulating film 507 is not restricted to such a silicon oxynitride film, but a different insulating film containing silicon may well be employed in the form of a single layer or a stacked structure. By way of example, in case of employing a silicon oxide film, it can be formed by the plasma CVD in such a way that TEOS (Tetra Ethyl Ortho Silicate) and $O_2$ are mixed, and that electric discharge is induced under the conditions of a reaction pressure of 40 Pa, a substrate temperature of 300–400° C. and a radio-frequency (13.56 MHz) power density of 0.5–0.8 $W/cm^2$. The silicon oxide film thus prepared is thereafter subjected to thermal annealing at 400–500° C., whereby characteristics favorable as the gate insulating film can be attained.

Further, the gate insulating film 507 is overlaid with a first conductive film 508 and a second conductive film 509 for forming gate electrodes. In this embodiment, the first conductive film 508 is formed of Ta to a thickness of 50–100 nm, while the second conductive film 509 is formed of W to a thickness of 100–300 nm.

The Ta film is formed by sputtering, in which a target of Ta is sputtered by Ar. In this case, when a suitable amount of Xe or Kr is added into the sputtering gas Ar, the internal stresses of the Ta film to be formed can be relieved to prevent the film from peeling off. Besides, the Ta film of α phase exhibits a resistivity of about 20 $\mu\Omega$·cm and can be used for the gate electrodes, but the Ta film of β phase exhibits a resistivity of about 180 $\mu\Omega$·cm and is unsuited to the gate electrodes. Tantalum nitride (TaN) has a crystal structure close to the α phase of Ta. Therefore, when a TaN film is formed as an underlying layer to a thickness of about 10–50 nm beforehand, the Ta film in the a phase can be readily obtained.

On the other hand, the W film is formed by sputtering with W used as a target. Alternatively, it can be formed in accordance with thermal CVD employing tungsten hexafluoride ($WF_6$). Anyway, the W film needs to be lowered in resistivity for use as the gate electrodes, and it should desirably have its resistivity set at 20 $\mu\Omega$·cm or less. The W film can have its resistivity lowered by enlarging crystal grains, but it has its crystallization hampered to turn into a high resistivity, in a case where impurity elements such as oxygen are contained in large amounts in this W film. In the case of employing the sputtering, therefore, the W film is formed by employing a W target at a purity of 99.9999% and by taking sufficient care that impurities do not mix from within a gaseous phase during the formation of the film. Thus, a W film exhibiting a resistivity of 9–20 $\mu\Omega$·cm can be realized.

Subsequently, as shown in FIG. 6B, masks 510–513 made of a resist are formed, and a first etching process for forming the gate electrodes is carried out. Although an etching method is not restricted, ICP (Inductively Coupled Plasma) etching is preferably employed. In this case, $CF_4$ and $Cl_2$ are mixed as an etching gas, and a plasma is generated by feeding RF (13.56 MHz) power of 500 W to a coiled electrode under a pressure of 0.5–2 Pa, preferably 1 Pa. RF (13.56 MHz) power of 100 W is also fed to a substrate side (sample stage), whereby a negative self-bias voltage is, in effect, applied. In the case of mixing $CF_4$ and $Cl_2$, both the W film and the Ta film are etched substantially equally.

When the resist masks 510–513 are properly shaped, the end parts of first conductive layers and second conductive layers are brought into a tapered shape owing to the effect of the bias voltage applied to the substrate side, under the above etching conditions. The angle of the tapered portions become 15–45°. In order to etch the conductive films 508, 509 without leaving residues on the gate insulating film 507, an etching time period may be increased at a rate of about 10–20%. Since the selection ratio of the silicon oxynitride film 507 relative to the W film 509 is 2–4 (typically, 3), the denuded surface of the silicon oxynitride film 507 is etched about 20–50 nm by an overetching process. Thus, conductive layers 515–518 (first conductive layers 515a–518a and the second conductive layers 515b–518b) of the first shape as consist of the first conductive layers and the second conductive layers are formed by the first etching process. Numeral 514 designates regions which serve as gate insulating films, and which are formed in such a way that the parts of the gate insulating film 507 not covered with the conductive layers 515–518 of the first shape are thinned by being etched about 20–50 nm.

Besides, a first doping process is carried out to dope the insular semiconductor layers 503–506 and 563 with an impurity element for bestowing the n-conductivity type. A doping method may be ion doping or ion implantation. The ion doping is performed under the conditions of a dose of $1\times10^{13}$–$5\times10^{14}$ atoms/cm$^2$ and an acceleration voltage of 60–100 keV. An element belonging to Group-15 of the periodic table, typically phosphorus (P) or arsenic (As), is employed as the impurity element for bestowing the n-conductivity type, and the element phosphorus (P) is employed here. In this case, the conductive layers 515–518 serve as masks against the impurity element for bestowing the n-conductivity type, so that first impurity regions 519–523 are formed in self-alignment fashion. The first impurity regions 519–523 are doped with the impurity element for bestowing the n-conductivity type, within a concentration range of $1\times10^{20}$–$1\times10^{21}$ atoms/cm$^3$.

Subsequently, a second etching process is carried out as shown in FIG. 6C. Here, the ICP etching is employed as in the foregoing. $CF_4$ and $Cl_2$ and $O_2$ are mixed as an etching gas, and a plasma is generated by feeding RF (13.56 MHz) power of 500 W to a coiled electrode under a pressure of 1 Pa. RF (13.56 MHz) power of 50 W is fed to the substrate side (sample stage), thereby to apply a self-bias voltage which is lower than in the first etching process. The W films of the second conductive layers 515b–518b are anisotropically etched under such conditions, and the Ta films of the first conductive layers 515a–518a are anisotropically etched at an etching rate lower than that of the W films, thereby to form conductive layers 529–532 (first conductive layers 529a–532a and the second conductive layers 529b–532b) of the second shape. Numeral 528 designates regions which serve as the gate insulating films, and which are formed in such a way that the parts of the gate insulating films 514 not covered with the conductive layers 529–532 of the second shape are further thinned by being etched about 20–50 nm.

The etching reactions of the W film and the Ta film based on the mixed gas consisting of $CF_4$ and $Cl_2$ can be conjectured from the vapor pressures of radicals or ion species and reaction products which are produced. When the vapor pressures of the fluorides and chlorides of the elements W and Ta are compared, the vapor pressure of $WF_6$ being the fluoride of the element W is extraordinarily high, and the vapor pressures of the other products $WCl_5$, $TaF_5$ and $TaCl_5$ are nearly equal. Accordingly, both the W film and the Ta film are etched by the mixed gas consisting of $CF_4$ and $Cl_2$. However, when a suitable amount of $O_2$ is added into the mixed gas, $CF_4$ and $O_2$ react to turn into CO and F, and F radicals or F ions are produced in large amounts. As a result, the etching rate of the W film as to which the fluoride of the element W exhibits the high vapor pressure increases. On the other hand, even when the amount of the element F has enlarged, the etching rate of the Ta film is increased relatively little. Besides, since the element Ta is more liable to oxidation than the element W, the surface of the Ta film is oxidized by the addition of $O_2$. Since the oxide of the element Ta does not react with fluorine or chlorine, the etching rate of the Ta film lowers still further. It is accordingly permitted to create a difference between the etching rates of the W film and the Ta film, and to make the etching rate of the W film higher than that of the Ta film.

Subsequently, a second doping process is carried out as shown in FIG. 7A. In this case, an impurity element for bestowing the n-conductivity type is introduced under the conditions of a lower dose and a higher acceleration voltage than in the first doping process. By way of example, the second doping process is performed by setting the acceleration voltage at 70–120 keV and the dose at $1\times10^{13}$ atoms/cm$^2$, thereby to form new impurity regions inside the first impurity regions 519–522 formed in the insular semiconductor layers 503–506 by the steps shown in FIG. 6B. More specifically, the doping here employs the conductive layers 529–532 of the second shape as masks against the impurity element, and it is performed so as to introduce the dopant element even into regions under the first conductive layers 529a–532a. Thus, the new impurity regions are formed as third impurity regions 537–540 which are overlapped by the first conductive layers 529a–532a, and second impurity regions 533–536 which lie between the first impurity regions 519–522 and the third impurity regions 537–540. The impurity element for bestowing the n-conductivity type is set at a concentration of $1\times10^{17}$–$1\times10^{19}$ atoms/cm$^3$ in the second impurity regions, and at a concentration of $1\times10^{16}$–$1\times10^{18}$ atoms/cm$^3$ in the third impurity regions.

Next, as shown in FIG. 7B, fourth impurity regions 544–546 of the opposite conductivity type to one conductivity type are formed in the insular semiconductor layer 504 for forming a p-channel TFT. The impurity regions 544–546 are formed in self-alignment fashion by employing the second conductive layer 530 as a mask against an impurity region. On this occasion, the insular semiconductor layers 503, 505 and 506 for forming n-channel TFTs are entirely covered with masks 541–543 of a resist beforehand. The impurity regions 544–546 are doped with phosphorus at concentrations different from one another, and are formed by ion doping which employs diborane ($B_2H_6$). In any of the regions 544–546, the impurity concentration is set at $2\times10^{20}$–$2\times10^{21}$ atoms/cm$^3$.

The impurity regions are formed in the respective insular semiconductor layers by the steps thus far described. The conductive layers of the second shape 529–532 function as the gate electrodes.

Thereafter, as shown in FIG. 7C, the step of activating the impurity elements introduced into the respective insular semiconductor layers is performed for the purpose of controlling the conductivity types. This step is implemented by thermal annealing with an annealing furnace. Alternatively, laser annealing or rapid thermal annealing (RTA) is applicable. The thermal annealing is carried out at a temperature of 400–700° C., typically 500–600° C., in a nitrogen atmosphere whose oxygen content is 1 ppm or less, preferably 0.1 ppm or less. In this embodiment, a heat treatment is performed at 500° C. for 4 hours.

The laser annealing utilizes the beam of an excimer laser having a wavelength of or below 400 nm, or the second higher harmonics (532 nm) of the beam of a YAG laser or a YVO$_4$ laser. The conditions of the activation shall be properly chosen by a person who controls the treatment. However, in the case of employing the excimer laser, it is allowed to set a pulsed lasing frequency at 30 Hz and a laser energy density at 100–300 mJ/cm$^2$. Besides, in the case of employing the YAG laser, it is allowed to employ the second higher harmonics of the emitted laser beam and to set a pulsed lasing frequency at 1–10 kHz and a laser energy density at 200–400 mJ/cm$^2$. Herein, the whole surface of the substrate is irradiated with the laser beam condensed in the shape of a line having a width of 100–1000 μm, for example, 400 μm, and the overlap percentage of such rectilinear laser beams on this occasion is set at 80–98%.

Further, a heat treatment is further performed at 300–450° C. for 1–12 hours in an atmosphere containing 3–100% of hydrogen, as the step of hydrogenating the insular semiconductor layers 503–506, 563. This step is the processing step in which dangling bonds existing in the semiconductor layers are terminated with hydrogen atoms excited thermally. Plasma hydrogenation (which employs hydrogen excited by a plasma) may well be performed as another expedient for the hydrogenation.

After the activating and hydrogenating processes, gate wiring lines, a signal wiring line and a capacitor wiring line are formed of a conductive material of low resistance. The conductive material of low resistance contains Al or Cu as its main component, and the gate wiring lines, etc. are formed of such a material. In this embodiment, the main component is Al by way of example. More specifically, an Al film containing 0.1–2 weight-% of Ti is formed on the whole surface of the substrate as a low-resistance conductive layer (not shown). The Al film has a thickness of 200–400 nm (preferably, 250–350 nm). Subsequently, a predetermined resist pattern is formed on the Al film, and this Al film is subjected to an etching process, thereby to form the gate wiring lines 547, 549, the signal wiring line 548 and the capacitor wiring line 550. When the etching process of the wiring lines is implemented by wet etching with an etching solution based on phosphoric acid, these wiring lines can be formed at a favorable selective workability with the underlying film 514.

In case of using Cu for the gate wiring lines, etc., a tantalum nitride film is formed to a thickness of 50–200 nm as an underlying layer beforehand in order to enhance close adhesion. A Cu film is formed to a thickness of 200–500 nm by sputtering or plating, and it is formed into the wiring lines by an etching process. The Cu wiring lines have an immunity against electromigration higher than that of the Al wiring lines, and can be made finer.

Figure 8:
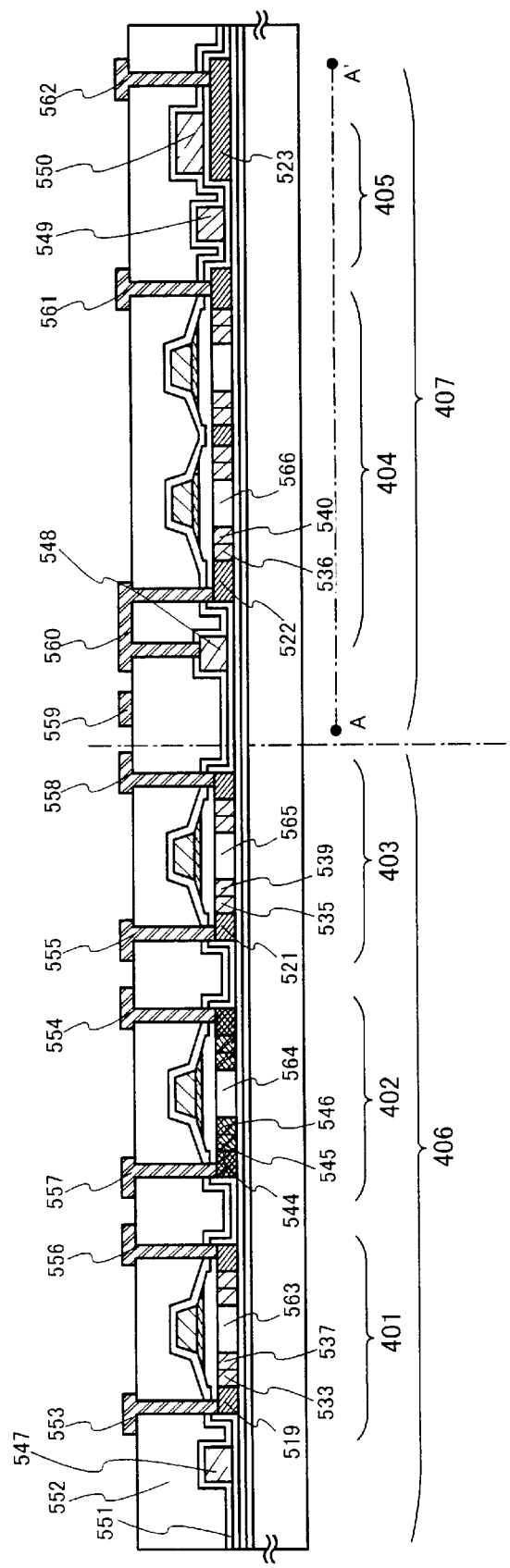
FIG. 8 is a sectional view for explaining the fabricating steps of the pixel TFT and the TFTs of the driver circuit.

Referring to FIG. 8, a first interlayer insulating film 551 is formed of a silicon oxynitride film at a thickness of 100–200 nm. The first interlayer insulating film 551 is overlaid with a second interlayer insulating film 552 formed of an organic insulator material. The second interlayer insulating film 552 is formed having an average thickness of 1.0–2.0 μm. Usable as the organic insulator material is polyimide, an acrylic resin, polyamide, polyimidoamide, BCB (benzocyclobutene), or the like. By way of example, in case of employing polyimide of the type which is thermally polymerized after being applied onto the substrate, it is baked at 300° C. in a clean oven so as to form the second interlayer insulating film 552. Besides, in case of employing the acrylic resin, one of two-fluid type is employed, and the film 552 can be formed in such a way that a base material and a hardener are mixed, that the whole surface of the substrate is coated with the mixed solution by a spinner, that the coating is preliminarily heated at 80° C. for 60 (seconds) by a hot plate, and that the preheated coating is baked at 250° C. for 60 minutes in a clean oven.

Besides, the driver circuit 406 is formed with source wiring lines 553–555 which establish contacts with the source regions of the insular semiconductor layers 503–505, and drain wiring lines 556–558 which establish contacts with the drain regions thereof. Also, the pixel portion 407 is formed with a common wiring line 559, a pixel electrode 561, a capacitor wiring line 562 and a connecting electrode 560. The connecting electrode 560 establishes the electrical connection of a signal wiring line 548 with the pixel TFT 404. As shown in FIG. 14C by way of example, each of the wiring lines laid on the second interlayer insulating film 552 is formed of a Ti film 768a being 50–200 nm thick, an Al film 768b being 100–300 nm thick, and a tin (Sn) film or Ti film 768c being 50–200 nm thick. Each of the source wiring lines 553–555, drain wiring lines 556–558 and pixel electrode 561 thus constructed establishes contact with the source or drain region 765 of the corresponding TFT by the Ti film 768a through a contact hole formed in the second interlayer insulating film 552. Accordingly, the element Al and the semiconductor are prevented from coming into direct touch and reacting, and the reliability of a contact portion is heightened.

In the above way, the driver circuit 406 having the n-channel TFT 401, p-channel TFT 402 and n-channel TFT 403, and the pixel portion 407 having the pixel TFT 404 and storage capacitor 405, can be formed on the identical substrate. Here in this specification, such a substrate shall be termed an "active matrix substrate" for the sake of convenience.

The n-channel TFT 401 of the driver circuit 406 includes a channel forming region 563, the third impurity region 537 (Gate Over-Lapped Drain: GOLD region) overlapped by the conductive layer of the second shape 529 forming the gate electrode, the second impurity region 533 (Lightly Doped Drain: LDD region) formed outside the gate electrode, and the first impurity region 519 functioning as the source region or drain region. The p-channel TFT 402 includes a channel forming region 564, the fourth impurity region 546 overlapped by the conductive layer of the second shape 530 forming the gate electrode, the fourth impurity region 545 formed outside the gate electrode, and the fourth impurity region 544 functioning as the source region or drain region. The n-channel TFT 403 includes a channel forming region 565, the third impurity region 539 (GOLD region) overlapped by the conductive layer of the second shape 531 forming the gate electrode, the second impurity region 535 (LDD region) formed outside the gate electrode, and the first impurity region 521 functioning as the source region or drain region.

The pixel TFT 404 of the pixel portion includes channel forming regions 566, the third impurity regions 540 (GOLD regions) overlapped by the conductive layer of the second shape 532 forming the gate electrodes, the second impurity regions 536 (LDD regions) formed outside the gate electrodes, and the first impurity regions 522 functioning as the source regions or drain regions. Besides, the semiconductor layer 523 functioning as one electrode of the storage capacitor 405 is doped with the impurity element for bestowing the n-type, at the same concentration as that of the first impurity regions 519–522. A retention capacitance is constituted by the semiconductor layer 523, the capacitor wiring line 550, and the insulating film (the same layer as that of the gate insulating films) interposed between the layer 523 and the line 550. However, the storage capacitor 405 shown in FIG. 8 is that of the adjacent pixel.

The top view of the pixel portion of the active matrix substrate fabricated in this embodiment is such that line A–A' in FIG. 8 corresponds to line A–A' indicated in FIG. 2. More specifically, the common wiring line 559, signal wiring line 548, connecting wiring line 560, pixel electrode 561, gate wiring line 549 and capacitor wiring line 550 shown in FIG. 8 correspond to the common wiring line 113, signal wiring line 106, connecting electrode 111, pixel electrode 112, gate wiring line 104 and capacitor wiring line 105', respectively.

In this manner, the active matrix substrate having the pixel structure of the IPS mode according to the present invention is formed with the signal wiring lines and the common electrodes at the different layers and is endowed with the pixel structure as shown in FIG. 2, whereby the aperture ratio of the display device can be enhanced. Moreover, the gate wiring lines are formed of the low-resistance conductive material, whereby a wiring resistance can be made low enough to fabricate the display device whose pixel portion (screen size) is in the 4-inch class or above. Both the Aspects of Performance 1 and 2 are applicable as the constructions of the electrode of the pixel portion.

Embodiment 2

Figure 9:
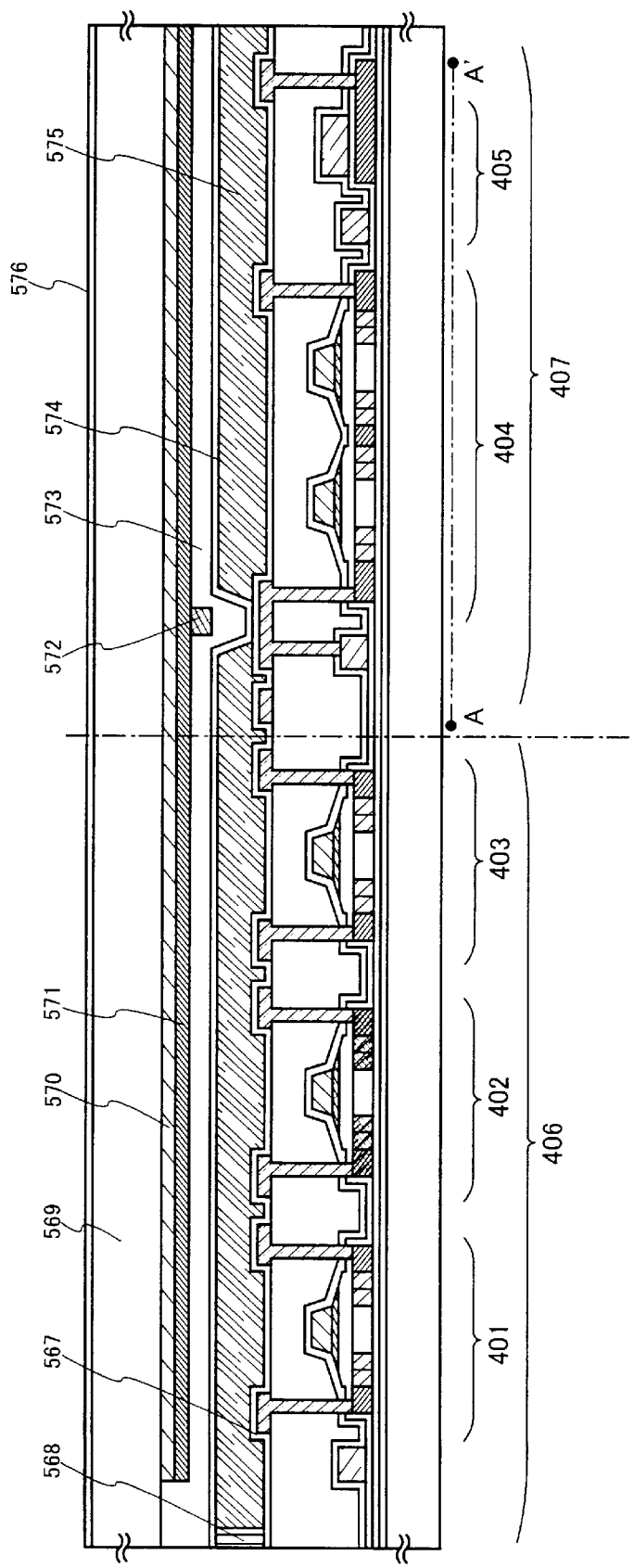
FIG. 9 is a sectional view of an active matrix type liquid-crystal display device according to the present invention.

In this embodiment, there will be described a process for fabricating an active matrix type liquid-crystal display device from the active matrix substrate prepared in Embodiment 1. FIG. 9 shows a state where the active matrix substrate and a counter substrate 569 are stuck together. Initially, the active matrix substrate in the state of FIG. 8 is overlaid with an orientation film 567, which is subsequently subjected to rubbing. The counter substrate 569 is formed with color filter layers 570, 571, an overcoat layer 573, and an orientation film 574. The color filter layer 570 of red and the color filter layer 571 of blue are formed over the TFTs in a stacked state so as to serve also as a light shield film. Besides, the color filter layer 570 of red, the color filter layer 571 of blue and a color filter layer 572 of green are stacked in correspondence with the connecting electrode 560, so as to form a spacer. The color filter layer of each color is formed by mixing a corresponding pigment into an acrylic resin, so as to have a thickness of 1–3 $\mu$m. It can be formed into a predetermined pattern by employing a mask made of a photosensitive material. The height of the spacer can be set at 2–7 $\mu$m, preferably 4–6 $\mu$m, in consideration of the thickness, 1–4 $\mu$m of the overcoat layer 573. Owing to the height, a gap is defined when the active matrix substrate and the counter substrate 569 are stuck together. The overcoat layer 573 is formed of an organic resin material of photo-setting type or thermosetting type, which is polyimide or an acrylic resin by way of example. Although the spacer may be arranged at any desired position, it is recommended to lie, for example, over the connecting wiring line 560 as shown in FIG. 9. Thereafter, the active matrix substrate and the counter substrate 569 are stuck together.

Figure 12:
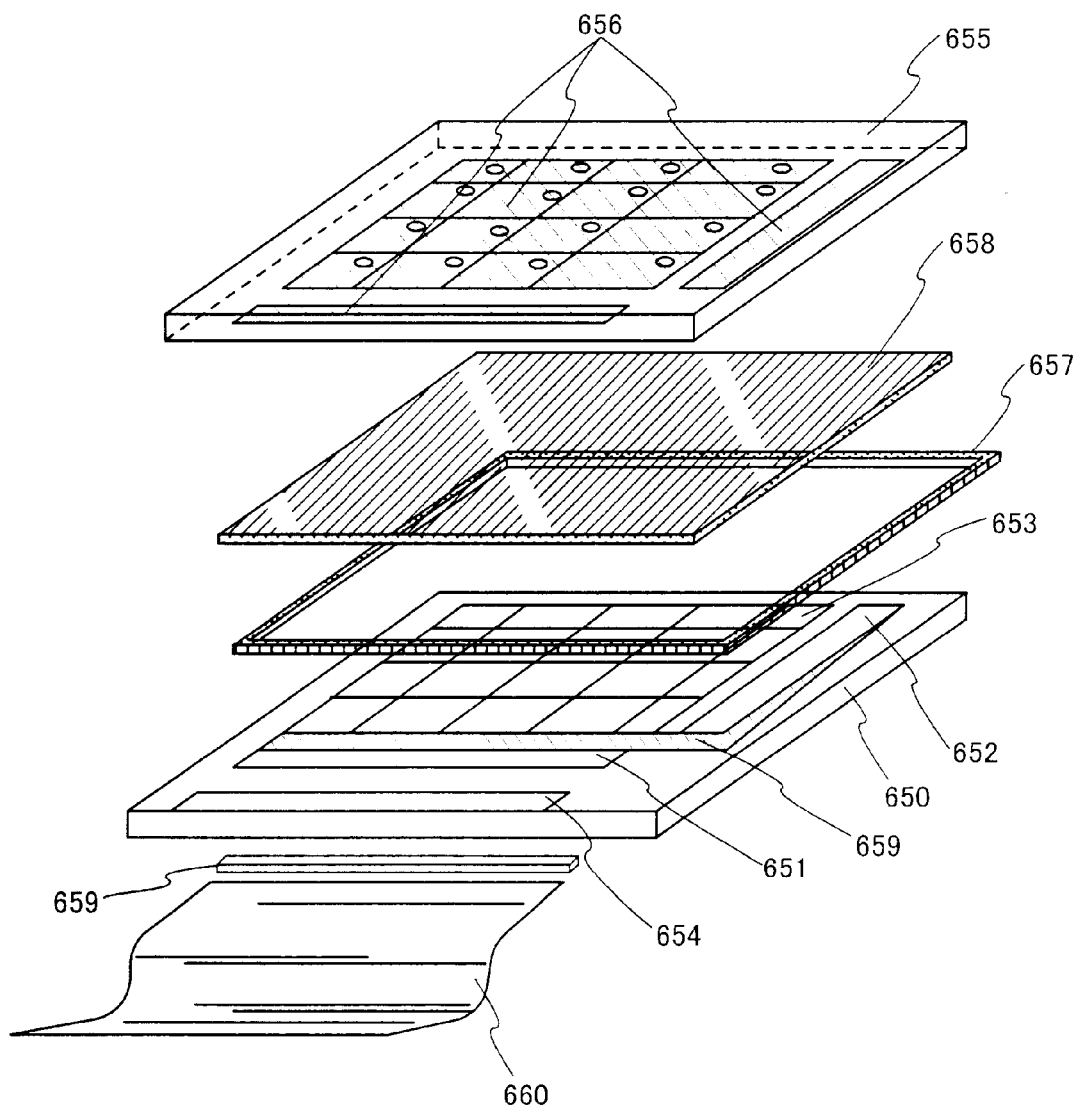
FIG. 12 is an assembly view of the active matrix type liquid-crystal display device.

FIG. 12 schematically illustrates a situation where the active matrix substrate indicated at numeral 650 here and the counter substrate indicated at numeral 655 here are stuck to each other. The active matrix substrate 650 is formed with a pixel portion 653, a scanning line side driver circuit 652, a signal line side driver circuit 651, external input terminals 654, wiring lines 659 for connecting the external input terminals 654 to the input portions of various circuits, and so forth. The counter substrate 655 is formed with color filter layers 656 in correspondence with those regions of the active matrix substrate 650 in which the pixel portion 653 and driver circuits 651, 652 are formed. The active matrix substrate 650 and the counter substrate 655 as stated above are stuck together through a sealant 657, and a liquid crystal is injected so as to provide a liquid crystal layer 658 inside the sealant 657. Further, an FPC (Flexible Printed Circuit) board 660 is stuck to the external input terminals 654 of the active matrix substrate 650. A reinforcement plate 659 may well be disposed in order to heighten the bonding strength of the FPC 660.

Cutting-plane line A–A' indicated in the pixel portion 407 in FIG. 9 corresponds to line A–A' in the top view of the pixel portion shown in FIG. 2. A red color filter and a blue color filter are formed on the side of the counter substrate in a stacked state so as to lie over the pixel TFT, and they are used as a light shield film.

Figure 11A:
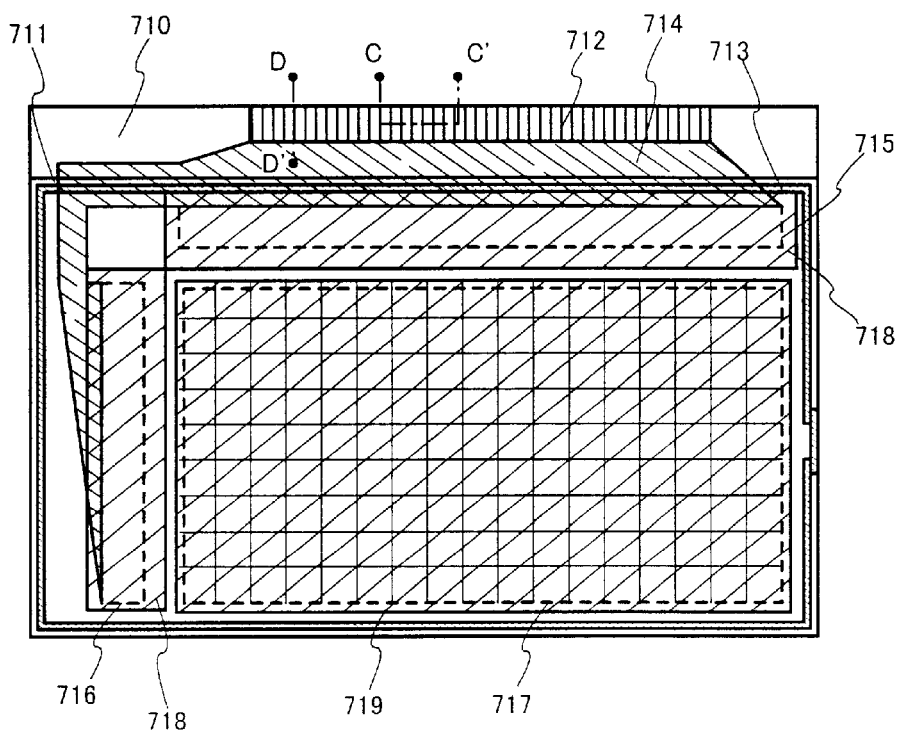
FIGS. 11A and 11B are a top view of the active matrix type liquid-crystal display device, and a model diagram with parts of a pixel enlarged, respectively.

FIG. 11A is a top view of the liquid-crystal display device thus fabricated. The active matrix substrate 710 indicated at numeral 710 here is formed with a pixel portion 717, driver circuits 715, 716, external input terminals 712 to which an FPC board is stuck, wiring lines 714 which connects the external input terminals 712 to the input portions of various circuits, and so forth. The counter substrate indicated at numeral 711 here is formed with a color filter 719, and so forth. The active matrix substrate 710 and the counter substrate 711 are stuck to each other through a sealant 713.

Figure 11B:
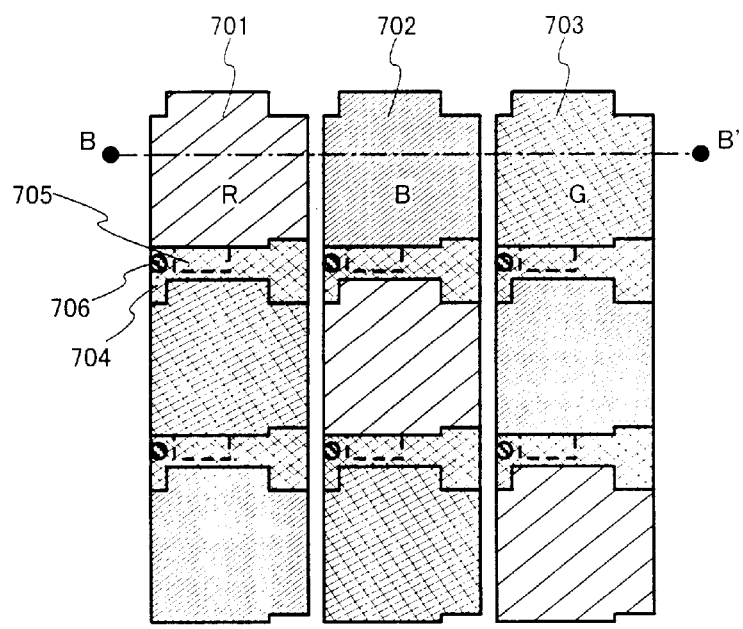

A light shield film 718 which is made up of a red color filter or stacked red and blue color filters, is formed on the side of the counter substrate 711 so as to lie over the scanning line side driver circuit 716 and the signal line side driver circuit 715. Besides, the color filter 719 formed on the side of the counter substrate 711 so as to lie over the pixel portion 717 is such that color filter layers of the respective colors of red (R), green (G) and blue (B) are disposed in correspondence with each pixel. A model diagram with parts of the pixel enlarged, is shown in FIG. 11B. In an actual display, one pixel is formed of the three colors of a red (R) color filter layer 701, a green (G) color filter layer 703 and a blue (B) color filter layer 702, and the color filter layers of the respective colors are arrayed at will. A red (R) color filter layer, or stacked red (R) color filter and blue (B) color filter layers is/are formed as a light shield film 704 in a region 705 where the TFT of each pixel is formed, and a region where a columnar spacer 706 is formed.

Figure 10:
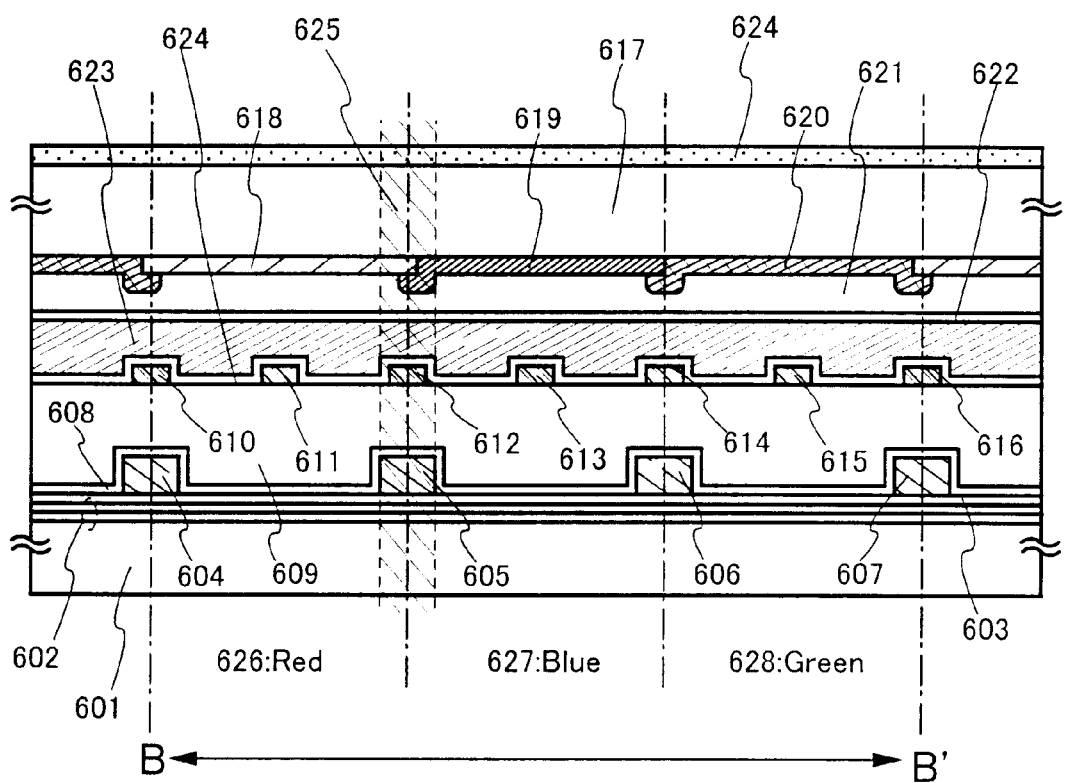
FIG. 10 is a sectional view for explaining the structure of a pixel portion in the active matrix type liquid-crystal display device according to the present invention.

A sectional view of the pixel having color filters arranged along line B–B' illustrated in FIG. 11B, is shown in FIG. 10. Referring to FIG. 10, a red (R) pixel 626, a blue (B) pixel 627 and a green (G) pixel 628 are formed. On the side of the active matrix substrate, a substrate 601 is overlaid with a subbing film 602, a gate insulating film 603, signal wiring lines 604–607, an interlayer insulating film 609, pixel electrodes 611, 613, 615, common wiring lines 610, 612, 614, 616, and an orientation film 624. On the side of the counter substrate indicated at numeral 617 here, a red (R) color filter 618, a blue (B) color filter 619 and a green (G) color filter 620 are formed in succession, and they are overlaid with an overcoat layer 621 and an orientation film 622. Besides, a liquid crystal layer 623 is formed between the active matrix substrate and the counter substrate 617. At the boundary between the adjacent pixels, the signal wiring line (605) and the common wiring line (612) are formed so as to overlap each other, and a light shield portion 625 is formed.

Figure 13:
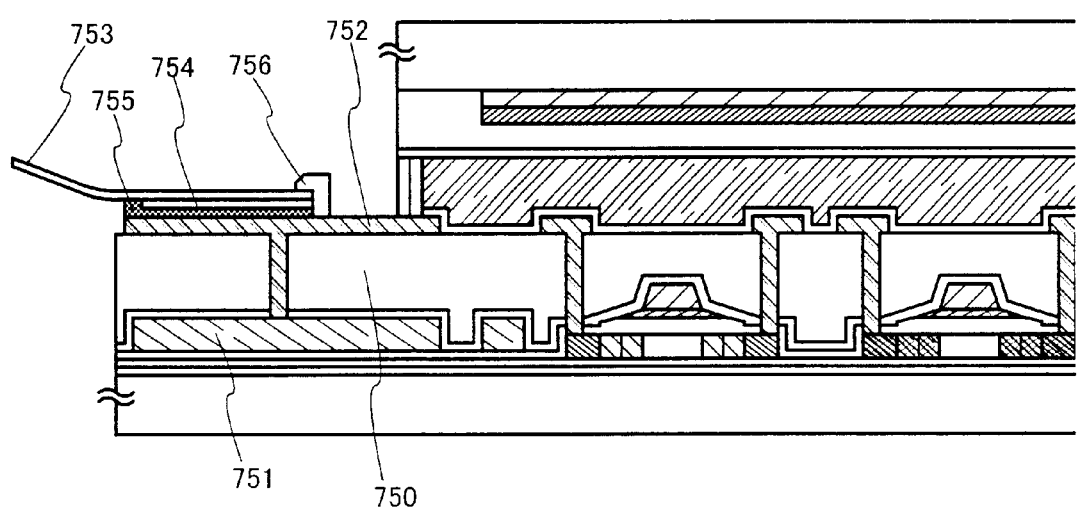
FIG. 13 is a sectional view for explaining the construction of a terminal unit.

FIG. 13 is a sectional view showing the construction of an external input terminal unit. Each external input terminal is formed on the side of the active matrix substrate, and it is formed at the same layers as those of a signal wiring line 751 and a common wiring line 752 between which an interlayer insulating film 750 is interposed, in order to lower an interlayer capacitance as well as a wiring resistance and to prevent a defect ascribable to disconnection. An FPC board formed of a base resin 753 and wiring lines 754 is stuck to the external input terminals by an anisotropic conductive resin 755. Further, a mechanical strength is heightened by a reinforcement plate 756.

Figure 14A:
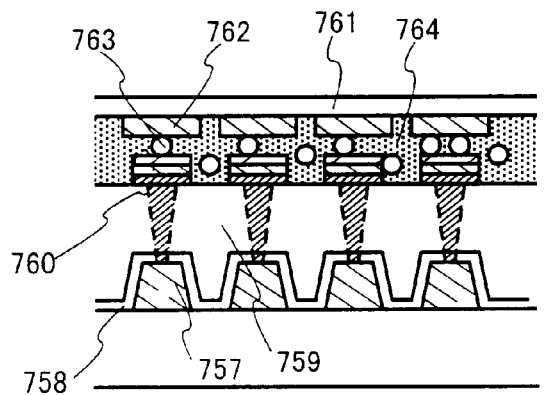
FIGS. 14A through 14C are sectional views for explaining the constructions of the terminal unit and a wiring line in detail.

FIG. 14A shows the external input terminal unit in detail, and it is a sectional view of the external input terminals 712 taken along line C–C' indicated in FIG. 11A. Each external input terminal which is provided on the side of the active matrix substrate, is formed of a wiring line 757 lying at the same layer as that of a signal wiring line, and a wiring line 760 lying at the same layer as that of a common wiring line. Of course, this construction is a mere example, and the external input terminal may well be formed only of either of the wiring lines 757 and 760. By way of example, in the case where the external input terminal is formed of the wiring line 757 lying at the same layer as that of the signal wiring line, an interlayer insulating film 759 formed over the wiring line 757 needs to be removed. In accordance with the construction described in Embodiment 1, the wiring line 760 formed at the same layer as that of the common wiring line is formed of a triple-layer structure which consists of a Ti film 760a, an Al film 760b and an Sn film 760c (refer to FIG. 14B). An FPC board is formed of a base film 761 and wiring lines 762, and it is stuck to the wiring lines 762 and to the wiring lines 760 lying at the same layer as that of the common wiring lines, by an anisotropic conductive adhesive consisting of a thermosetting adhesive 764 and conductive particles 763 dispersed therein, whereby an electrical connection structure is formed.

Figure 14B:
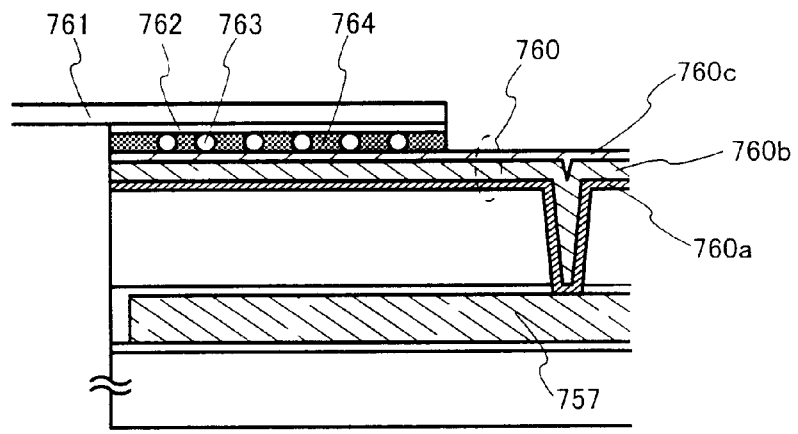
Figure 14C:
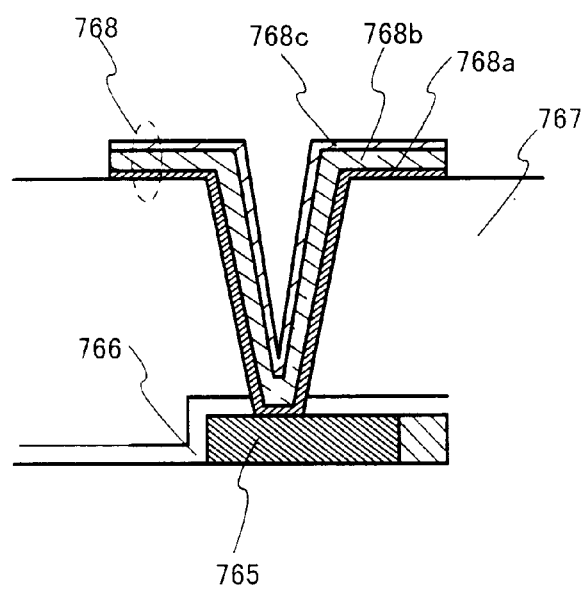

On the other hand, FIG. 14B is a sectional view of the external input terminal 712 taken along line D–D' indicated in FIG. 11A. The outside diameter of each conductive particle 763 is smaller than the pitch of the wiring lines 760. Therefore, when the conductive particles 763 are dispersed into the adhesive 764 in a suitable amount, each wiring line can establish an electrical connection with the corresponding wiring line on the side of the FPC board without short-circuiting the adjacent wiring line.

The liquid-crystal display device of the active matrix type utilizing the IPS mode, fabricated in the above way, can be employed as the display devices of various electronic equipment.

Embodiment 3

In this embodiment, another example in which the TFT structure of an active matrix substrate is different will be described with reference to FIG. 15.

Figure 15:
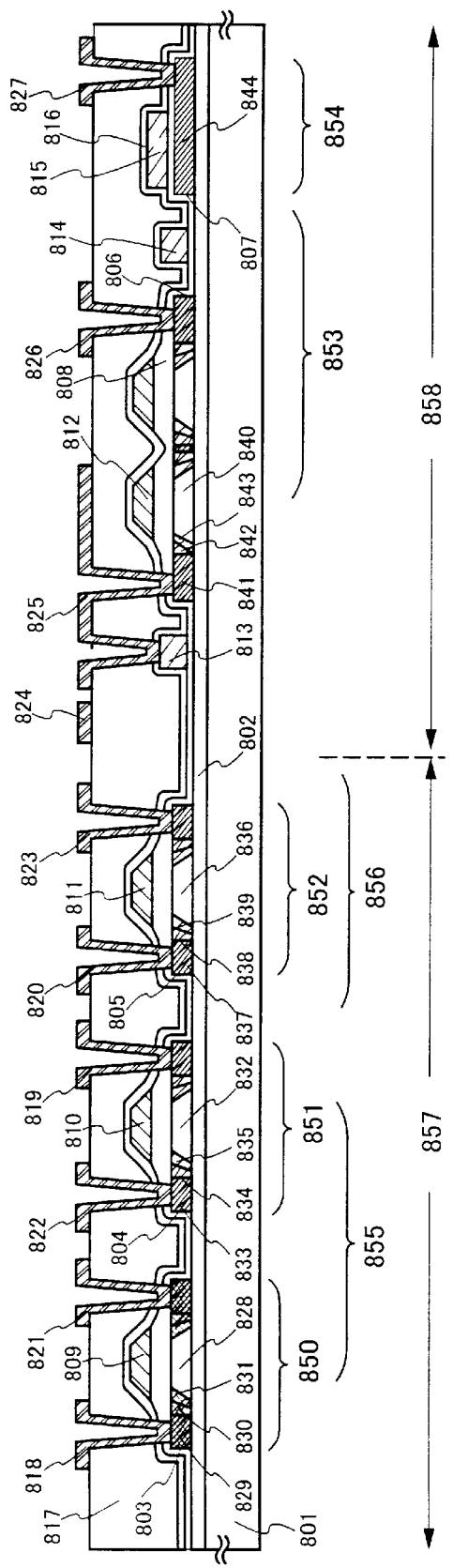
FIG. 15 is a sectional view for explaining the constructions of a pixel TFT and the TFT of a driver circuit in an example.

The active matrix substrate shown in FIG. 15 is formed with a driver circuit 857 and a pixel portion 858. The driver circuit 857 includes a logic circuit unit 855 having a first p-channel TFT 850 and a first n-channel TFT 851, and a sampling circuit unit 856 having a second n-channel TFT 852. The pixel portion 858 includes a pixel TFT 853 and a storage capacitor 854. The TFTs of the logic circuit unit 855 of the driver circuit 857 form a shift register circuit, a buffer circuit, etc. The TFTs of the sampling circuit unit 856 are basically formed as analog switches.

The TFTs are formed in such a way that channel forming regions, source and drain regions, LDD regions, etc. are provided in insular semiconductor films 803–806 which overlap a subbing film 802 formed on a substrate 801. The subbing film and the insular semiconductor films are formed in the same ways as in Embodiment 1. Gate electrodes 809–812 formed on a gate insulating film 808 feature that their end parts are in a tapered shape, and the LDD regions are formed by utilizing the tapered parts. Such a tapered shape can be formed by the anisotropic etching of a W film with an ICP etching equipment, as in Embodiment 1.

The LDD regions formed by utilizing the parts of the tapered shape are provided in order to enhance the reliability of the n-channel TFT, thereby to prevent the degradation of an ON current attributed to a hot carrier effect. As the LDD regions, the semiconductor film is doped with an impurity element through the end part of the gate electrode as well as the part of the gate insulating film vicinal to the end part, by accelerating the ions of the impurity element by an electric field in accordance with ion doping.

The first n-channel TFT 851 is formed with the first LDD region 835, second LDD region 834 and source or drain region 833 outside the channel forming region 832. Herein, the first LDD region 835 is formed so as to be overlapped by the gate electrode 810. Besides, the concentration of the impurity element of the n-conductivity type is higher in the second LDD region 834 than in the first LDD region 835 on the basis of the differences of the thicknesses of the gate insulating film and the gate electrode which overlap the first and second LDD regions. The second n-channel TFT 852 is similarly constructed, and it is constituted by the channel forming region 836, the first LDD region 839 overlapped by the gate electrode 811, the second LDD region 838 and the source or drain region 837. On the other hand, the p-channel TFT 850 has a single-drain structure, and it is formed with the impurity regions 829–831 doped with a p-type impurity, outside the channel forming region 828.

In the pixel portion 858, the pixel TFT 853 formed by an n-channel TFT is endowed with a multi-gate structure for the purpose of decreasing an OFF current, and it is provided with the first LDD regions 843 overlapped by the gate electrodes 812, the second LDD regions 842 and the source or drain regions 841 outside the channel forming regions 840. Besides, the storage capacitor 854 is formed of an insular semiconductor film 807, an insulating layer formed at the same layer as that of the gate insulating film 808, and a capacitor wiring line 815. The insular semiconductor film 807 is doped with the n-type impurity, and a voltage to be applied to the capacitor wiring line 815 can be suppressed low owing to a low resistivity.

An interlayer insulating film is formed of a first interlayer insulating film 816 which is made of an inorganic material such as silicon oxide, silicon nitride or silicon oxynitride and which is 50–500 nm thick, and a second interlayer insulating film 817 which is made of an organic insulator material such as polyimide, an acrylic resin, polyimideamide or BCB (benzocyclobutene). The second interlayer insulating film 817 is formed of the organic insulator material in this manner, whereby its surface can be favorably flattened. Besides, the organic resin material is, in general, low in permittivity, so that a parasitic capacitance can be lowered. Since, however, the organic resin material is hygroscopic and is unsuitable for a protective film, the second interlayer insulating film 817 should preferably be formed in combination with the first interlayer insulating film 816.

Thereafter, a resist mask in a predetermined pattern is formed, and contact holes which reach the source regions or drain regions formed in the respective insular semiconductor films are formed. The formation of the contact holes is implemented by dry etching. In this case, the interlayer insulating film 817 made of the organic resin material is first etched using a mixed gas consisting of $CF_4$, $O_2$ and He, as an etching gas, and the protective insulating film 816 is subsequently etched using $CF_4$ and $O_2$ as a mixed etching gas. Further, the gate insulating film 808 is etched after the etching gas is changed-over to $CHF_3$ in order to heighten the selection ratio of this film 808 to the insular semiconductor films 806–807. Thus, the contact holes can be favorably formed.

In addition, a conductive metal film is formed by sputtering or vacuum evaporation, a resist mask pattern is formed, and source or drain wiring lines 818–823, a pixel electrode 826, common wiring lines 824, 827 and a connecting wiring line 825 are formed by etching. The active matrix substrate having the pixel portion of the IPS mode constructed as shown in FIG. 2 or FIG. 4 can be formed in this way. Besides, even when the active matrix substrate of this embodiment is employed, the liquid-crystal display device of the active matrix type as described in Embodiment 2 can be fabricated.

Embodiment 4

In this embodiment, still another example in which the TFT structure of an active matrix substrate is different will be described with reference to FIG. 16.

Figure 16:
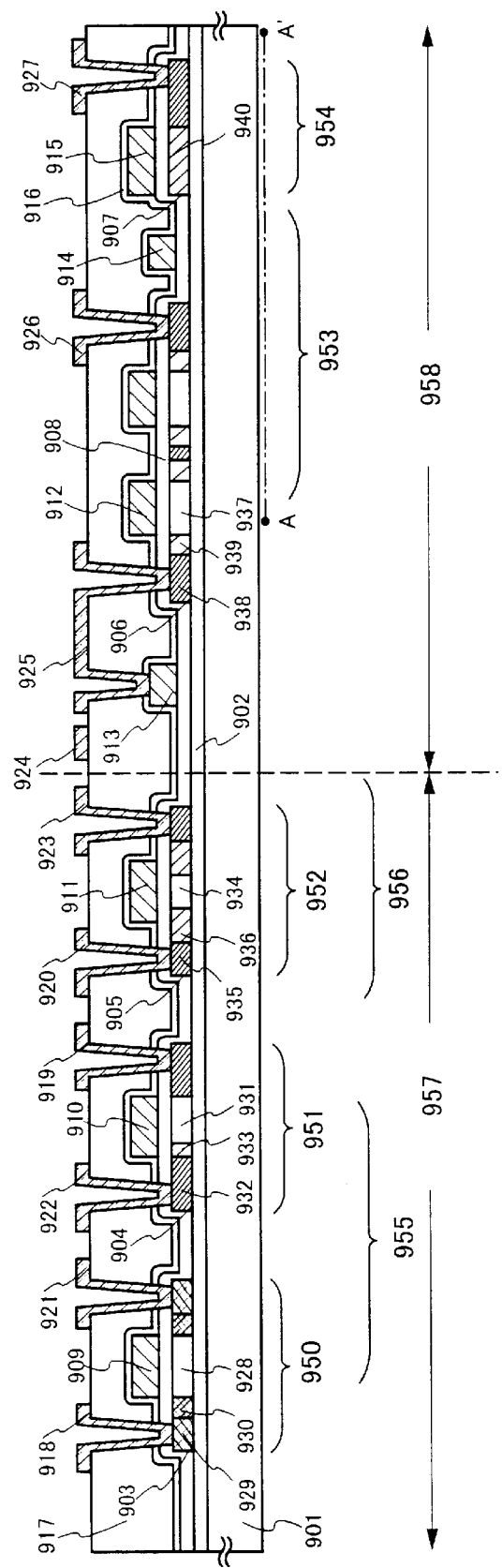
FIG. 16 is a sectional view for explaining the constructions of a pixel TFT and the TFT of a driver circuit in another example.

The active matrix substrate shown in FIG. 16 is formed with a driver circuit 957 and a pixel portion 958. The driver circuit 957 includes a logic circuit unit 955 having a first p-channel TFT 950 and a first n-channel TFT 951, and a sampling circuit unit 956 having a second n-channel TFT 952. The pixel portion 958 includes a pixel TFT 953 and a storage capacitor 954. The TFTs of the logic circuit unit 955 of the driver circuit 957 form a shift register circuit, a buffer circuit, etc. The TFTs of the sampling circuit unit 956 are basically formed as analog switches.

In fabricating the active matrix substrate mentioned in this embodiment, a subbing film 902 is first formed on a substrate 901 to a thickness of 50–200 nm by employing a silicon oxide film, a silicon oxynitride film or the like. Thereafter, insular semiconductor films 903–907 are formed from a crystalline semiconductor film prepared by laser crystallization or thermal crystallization. The insular semiconductor films 903–907 are overlaid with a gate insulating film 908. Besides, the insular semiconductor films 904, 905 for forming the n-channel TFTs 951, 952, and the insular semiconductor film 907 for forming the storage capacitor 954 are selectively doped with an impurity element for bestowing the n-conductivity type as is typified by phosphorus (P), at a concentration of $1\times10^{16}$–$1\times10^{19}$ atoms/cm$^3$.

Subsequently, gate electrodes 909–912, a gate wiring line 914, a capacitor wiring line 915 and a signal wiring line 913 are formed of a material which contains W or Ta. The gate wiring line, capacitor wiring line and signal wiring line may well be separately formed of a material of low resistivity, such as Al, as in Embodiment 1 or 3. Besides, those regions of the insular semiconductor films 903–907 which lie outside the gate electrodes 909–912 and the capacitor wiring line 915 are selectively doped with the impurity element for bestowing the n-conductivity type as is typified by phosphorus (P), at a concentration of $1\times10^{19}$–$1\times10^{21}$ atoms/cm$^3$. Thus, the first n-channel TFT 951 and the second n-channel TFT 952 are respectively formed with channel forming regions 931 and 934, LDD regions 933 and 936, and source or drain regions 932 and 935. The LDD regions 939 of the pixel TFT 953 are formed outside channel forming regions 937 in self-alignment fashion by utilizing the gate electrodes 912. The source or drain regions 938 of the pixel TFT 953 are formed likewise to those of the first and second n-channel TFTs 951, 952.

In the same way as in Embodiment 3, an interlayer insulating film is formed of a first interlayer insulating film 916 which is made of an inorganic material such as silicon oxide, silicon nitride or silicon oxynitride, and a second interlayer insulating film 917 which is made of an organic insulator material such as polyimide, an acrylic resin, polyimideamide or BCB (benzocyclobutene). Thereafter, a resist mask in a predetermined pattern is formed, and contact holes which reach the source regions or drain regions formed in the respective insular semiconductor films are formed. In addition, a conductive metal film is formed by sputtering or vacuum evaporation, and source or drain wiring lines 918–923, a pixel electrode 926, common wiring lines 924, 927 and a connecting wiring line 925 are formed. The active matrix substrate having the pixel portion of the IPS mode constructed as shown in FIG. 2 or FIG. 4 can be formed in this way. Besides, even when the active matrix substrate of this embodiment is employed, the liquid-crystal display device of the active matrix type as described in Embodiment 2 can be fabricated.

The first n-channel TFT 951 of the logic circuit 955 is endowed with a structure in which a GOLD region overlapped by the gate electrode 910 is formed on the drain side of this TFT 951. Owing to the GOLD region, a high electric field which is generated in the vicinity of the drain region of the TFT 951 can be relieved to prevent the creation of hot carriers and to prevent the deterioration of this TFT. The n-channel TFT of such a structure is suited to the buffer circuit or the shift register circuit. On the other hand, the second n-channel TFT 952 of the sampling circuit 956 has a structure in which GOLD regions and LDD regions are disposed on the source side and drain side of this TFT. The structure is intended to prevent the deterioration of the TFT 952 attributed to hot carriers in the analog switch which is operated by polarity inversion, and further to decrease the OFF current of this TFT. The pixel TFT 953 has an LDD structure, and is formed into a multi-gate structure intended to decrease the OFF current of this TFT. Meanwhile, the p-channel TFT 950 is formed into a single-drain structure, and it is formed with impurity regions 929, 930 doped with an impurity element of the p-conductivity type, outside a channel forming region 928.

In this manner, with the active matrix substrate shown in FIG. 16, the TFTs constituting the respectively corresponding circuits are optimized in accordance with specifications required for the pixel portion and the driver circuit, and it is especially considered to enhance the operating characteristics and reliabilities of the respective circuits.

Embodiment 5

Embodiment 1 has mentioned the example in which the gate electrodes are formed of the element selected from among Ta, W, Ti and Mo, or the alloy material or compound material containing the element, while the gate wiring lines are formed of the material of low resistivity, such as Al or Cu. Here in Embodiment 5, there will be described an example in which the element Al is employed for gate electrodes. Since a process for manufacturing an active matrix substrate is substantially the same as in Embodiment 1, the points of difference shall be explained here with reference to FIG. 6A through FIG. 8.

Referring to FIG. 6A, a first conductive film 508 is formed of a conductive film containing Ta, W or Ti. By way of example, a Ta film or W film or a TaN film is deposited by sputtering or vacuum evaporation. A second conductive film 509 is formed of a conductive film containing Al or Cu. It is formed of, for example, an Al film which contains 0.5–2 (atomic-%) of scandium (Sc).

In the first etching process shown in FIG. 6B, the etching of the Al film 509 into a tapered shape is performed by dry etching which is implemented in an ICP etching equipment by employing a mixed gas consisting of boron trichloride ($BCl_3$) and chlorine ($Cl_2$). Besides, although the second etching process shown in FIG. 6C may be performed by the dry etching likewise to the first etching process, the etching of the Al film 509 may well be done by a wet etching process which employs a solution of phosphoric acid.

Further, although not shown in detail, a signal wiring line 548, a gate wiring line 549 and a capacitor wiring line 550 are formed of the first conductive layer (508) and the second conductive layer (509) explained in this embodiment, simultaneously with gate electrodes (529–532).

After the doping processes shown in FIGS. 6B–7B, a first interlayer insulating film 551 is formed of a silicon nitride film or a silicon oxynitride film on the gate electrodes 529–532, signal wiring line 548, gate wiring line 549 and capacitor wiring line 550 to a thickness of 50–200 nm by plasma CVD. Thereafter, a hydrogenating process is performed at 300–500° C., preferably 350–450° C., in an atmosphere of nitrogen or an inert gas containing 1–3% of hydrogen. Impurity elements of the p- and n-conductivity types with which insular semiconductor films 503–506, 563 are doped, are activated by laser annealing. The laser annealing is implemented with the second higher harmonics (532 nm) of a laser beam emitted from a solid laser such as YAG laser, $YVO_4$ laser or YLF laser. More specifically, the laser beam emitted from a laser oscillator is condensed into the shape of a line or a rectangle by an optical system so as to irradiate the insular semiconductor films 503–506, 563 through the first interlayer insulating film 551. Since the second higher harmonics at the wavelength of 532 nm are transmitted through the silicon nitride film or silicon oxynitride film formed as the first interlayer insulating film 551 and are absorbed by the semiconductor films 503–506, 563 for the most part, they are suited to heat these semiconductor films and to activate the dopant impurity elements. Moreover, since the laser beam of the second higher harmonics at the wavelength of 532 nm is reflected from the Al surfaces of the gate electrodes 529–532 for the most part, it heats the insular semiconductor films 503–506 preferentially, so that the dopant impurity elements can be activated without degrading the Al film 509 of low refractoriness.

The subsequent steps may conform to Embodiment 1, and the active matrix substrate shown in FIG. 8 can be manufactured. A liquid-crystal display device as described in Embodiment 2 can be fabricated also with the active matrix substrate thus manufactured.

Embodiment 6

Figure 21A:
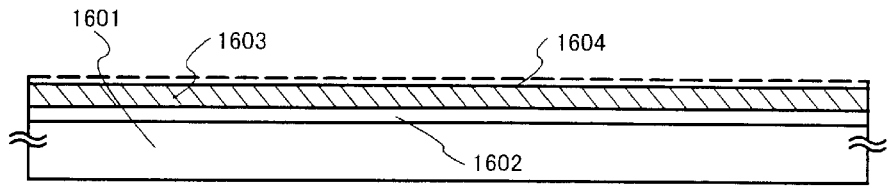
FIGS. 21A through 21E are schematic sectional views for explaining a process for preparing a crystalline semiconductor film.
Figure 21B:
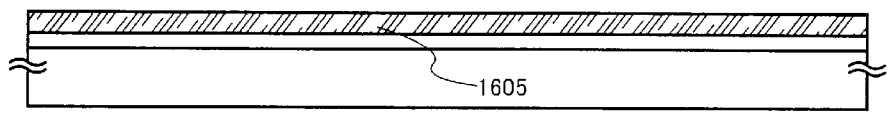

In this embodiment, there will be described a method of preparing a semiconductor film which is applicable to the present invention. Referring to FIG. 21A, a subbing film 1602 made of a silicon oxynitride film is formed on the principal surface of a substrate 1601, and it is overlaid with an amorphous semiconductor film 1603. The thickness of the amorphous semiconductor film 1603 may be set at 10–200 nm, preferably 30–100 nm. Further, a layer 1604 containing a catalyst element is formed on the whole surface of the amorphous semiconductor film 1603 by spin coating in which the resulting substrate structure is coated with an aqueous solution containing the catalyst element at a content of 10 ppm in terms of weight. As the catalyst-element containing layer 1604, a layer containing the pertinent element may well be formed to a thickness of 1–5 nm by sputtering or vacuum evaporation. Alternatively, the resulting substrate structure may well be exposed into a glow discharge plasma which is generated by applying radio-frequency power to an electrode made of the pertinent element. The catalyst element usable here is nickel (Ni), or any of germanium (Ge), iron (Fe), palladium (Pd), tin (Sn), lead (Pb), cobalt (Co), platinum (Pt), copper (Cu) and gold (Au). For the purpose of crystallization, a heat treatment is first performed at 350–500° C. so as to emit hydrogen remaining in the resulting film 1603, and a heat treatment is thereafter performed at 500–600° C. for 4–12 hours, for example, at 550° C. for 4 hours. Then, a crystalline semiconductor film 1605 shown in FIG. 21B is formed.

Figure 21C:
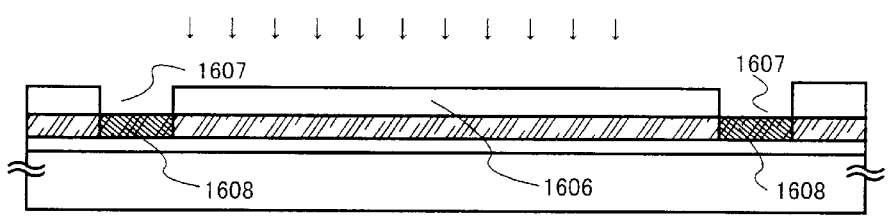

Subsequently, the step of gettering is performed in order that the catalyst element used at the step of crystallization may be removed from the crystalline semiconductor film 1605. The concentration of the catalyst element in the crystalline semiconductor film 1605 is lowered to $1 \times 10^{17}$ atoms/cm$^3$ or less, preferably down to $1 \times 10^{16}$ atoms/cm$^3$, by the step of gettering. A mask insulating film 1606 is formed on the surface of the crystalline semiconductor layer 1605 to a thickness of 150 nm, and openings 1607 are provided by patterning so as to form regions where the crystalline semiconductor layer 1605 is denuded. The regions are doped with phosphorus by ion doping or the like, thereby to form phosphorus containing regions 1608 in the crystalline semiconductor film 1605 (FIG. 21C).

Figure 21D:
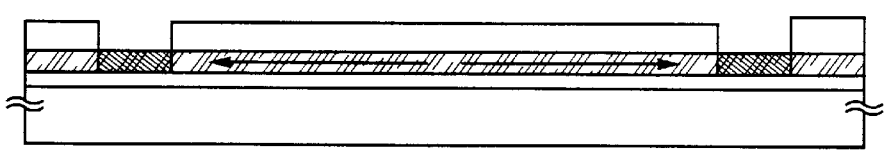
Figure 21E:
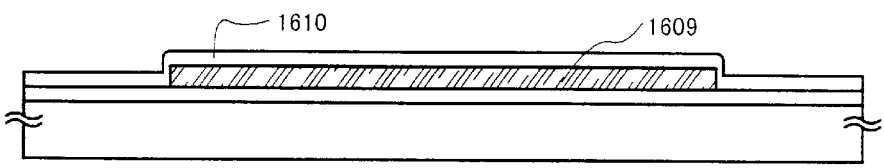

In this state, a heat treatment in a nitrogen atmosphere is carried out at 550–800° C. for 5–24 hours, for example, at 600° C. for 12 hours. Then, the phosphorus containing regions 1608 function as gettering sites, and the catalyst element remaining in the crystalline semiconductor film 1605 can be segregated into the phosphorus containing regions 1608 (FIG. 21D). Besides, the mask insulating film 1606 and the phosphorus containing regions 1608 are etched to be removed. Thus, it is possible to obtain a crystalline semiconductor film 1609 in which the concentration of the catalyst element used at the crystallizing step has been lowered to $1 \times 10^{17}$ atoms/cm$^3$ or less. Thereafter, a gate insulating film 1610 is formed on the crystalline semiconductor film 1609 (FIG. 21E).

Figure 22A:
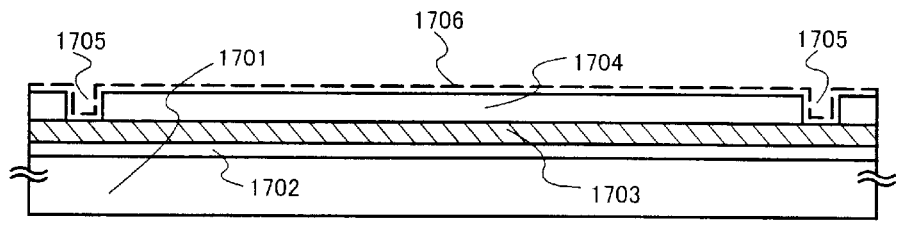
FIGS. 22A through 22E are schematic sectional views for explaining a process for preparing a crystalline semiconductor film.

Meanwhile, in an example shown in FIGS. 22A–22E, a subbing film 1702 and an amorphous semiconductor film 1703 are successively formed on a substrate 1701, and the surface of the amorphous semiconductor film 1703 is formed with a silicon oxide film 1704. On this occasion, the thickness of the silicon oxide film 1704 is set at 150 nm. Further, the silicon oxide film 1704 is patterned to form openings 1705 at selected parts. Thereafter, the resulting substrate structure is coated with an aqueous solution containing a catalyst element at a content of 10 ppm in terms of weight. Thus, a catalyst-element containing layer 1706 is formed having a structure in which it lies in touch with the amorphous semiconductor film 1703 in the openings 1705 only (FIG. 22A).

Figure 22B:
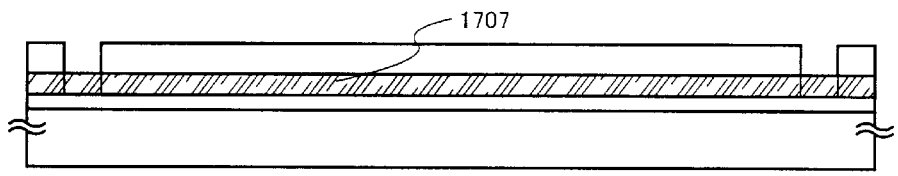

Subsequently, a heat treatment at 500–650° C. for 4–24 hours, for example, at 570° C. for 14 hours, is carried out, thereby to form a crystalline semiconductor film 1707. At this step of crystallization, the regions of the amorphous semiconductor film 1703 touched by the catalyst element are first crystallized, and the crystallization proceeds laterally from the regions. The crystalline semiconductor film 1707 thus formed is an aggregate of bar-like or needle-like crystals, and the respective crystals have grown with a certain specified directivity when viewed macroscopically. Therefore, the film 1707 has the advantage of uniform crystallinity (FIG. 22B).

Figure 22C:
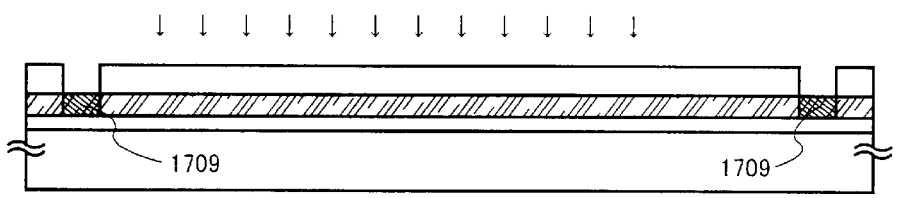

Subsequently, the step of removing the catalyst element used at the step of crystallization, from the crystalline semiconductor film 1707 is performed as in FIGS. 21C and 21D. More specifically, the substrate structure in the state of FIG. 22B is subjected to the step of doping with phosphorus, thereby to provide phosphorus containing regions 1709 in the crystalline semiconductor film 1707. The dose of phosphorus in the regions 1709 is set at $1 \times 10^{19}$–$1 \times 10^{21}$ atoms/cm$^3$ (FIG. 22C). In this state, a heat treatment in a nitrogen atmosphere is carried out at 550–800° C. for 5–24 hours, for example, at 600° C. for 12 hours. Then, the phosphorus containing regions 1709 function as gettering sites, and the catalyst element remaining in the crystalline semiconductor film 1707 can be segregated into the phosphorus containing regions 1709 (FIG. 22D).

Besides, the masking oxide film 1704 and the phosphorus containing regions 1709 are etched to be removed, thereby to form an insular crystalline semiconductor film 1710. In addition, a gate insulating film 1711 is formed in close touch with the crystalline semiconductor film 1710. The gate insulating film 1711 is formed of one or more layers selected from the group consisting of a silicon oxide film and a silicon oxynitride film. The thickness of the film 1711 may be set at 10–100 nm, preferably 50–80 nm (FIG. 22E).

Alternatively, it is possible to apply a method in which the catalyst element is removed from within the crystalline semiconductor film 1710 by performing a heat treatment in an atmosphere which contains halogen (typically, chlorine) and oxygen, without performing the above step of gettering phosphorus. Also, when the formation of the gate insulating film 1711 is followed by a heat treatment which is performed in an atmosphere containing halogen and oxygen and under the conditions of, for example, a temperature of 950° C. and a time period of 30 minutes, a thermal oxide film is formed at the interface between the crystalline semiconductor film 1710 and the gate insulating film 1711, and the good interface of low interstate density can be attained. Incidentally, the treating temperature may be chosen within a range of 700–1100° C., and the treating time period within a range of 10 minutes–8 hours.

Figure 22D:
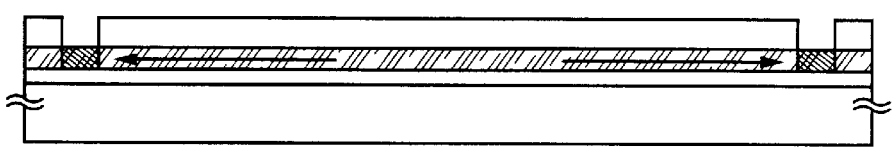
Figure 22E:
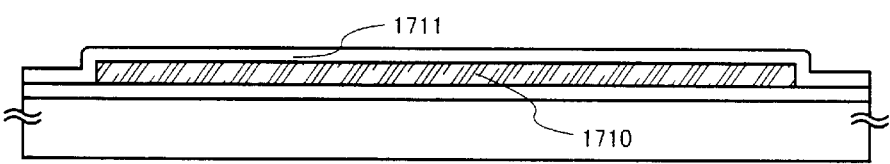

Also, the gettering process based on phosphorus as explained in FIGS. 21C and 21D or in FIGS. 22C and 22D can be simultaneously performed at the thermal annealing step for activation in Embodiment 1 as shown in FIG. 7C. In that case, impurity regions doped with phosphorus function as gettering sites, and a catalyst element can be segregated into these impurity regions from the channel forming regions.

The insular semiconductor film 1609 or 1710 thus prepared can be used for fabricating any of the active matrix substrates described in Embodiments 1, 3, 4 and 5.

Embodiment 7

In each of the active matrix substrates described in Embodiments 1, 3 and 4, the gate electrodes, gate wiring line, signal wiring line and capacitor wiring line are simultaneously formed of the same material, whereby the number of photo-masks for the fabricating process can be decreased to five. That is, the photo-masks totaling five suffice for forming the insular semiconductor films, for forming the gate electrodes and other wiring lines, for forming the mask at the step of doping with the p-type impurity, for forming the contact holes, and for forming the pixel electrodes and the common wiring line. Owing to the decrease in the number of the photo-masks, not only the number of photo-lithographic steps is decreased, but also film forming, washing and etching steps to be performed before and after the photolithographic steps are dispensed with. Therefore, the manufacturing cost of the active matrix substrate can be curtailed, and the available percentage of products in the fabricating process can be enhanced.

Embodiment 8

In this embodiment, semiconductor devices in each of which the active matrix type liquid-crystal display device as explained in Embodiment 2 is incorporated will be described with reference to FIGS. 19A–19F and FIGS. 20A–20C.

Mentioned as such semiconductor devices are a portable information terminal (electronic notebook, mobile computer, portable telephone set, or the like), a video camera, a still camera, a personal computer, a television receiver, and so forth. Examples of them are illustrated in FIGS. 19A through 20C.

Figure 19A:
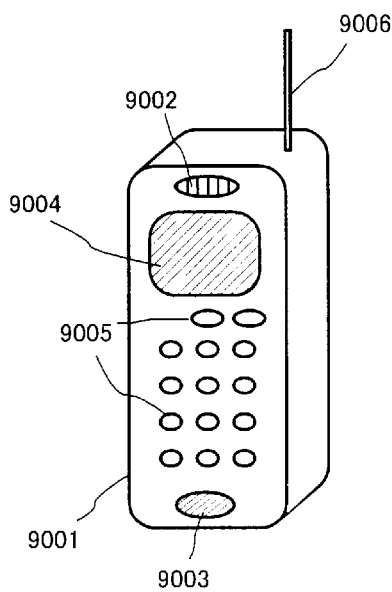
FIGS. 19A through 19F are views each showing an example of an electronic equipment which employs the active matrix type liquid-crystal display device according to the present invention.

FIG. 19A shows a portable telephone set, which is constructed of the body 9001, a voice output unit 9002, a voice input unit 9003, a display unit 9004, operating switches 9005, and an antenna 9006. The present invention can be applied to the display unit 9004 including an active matrix substrate.

Figure 19B:
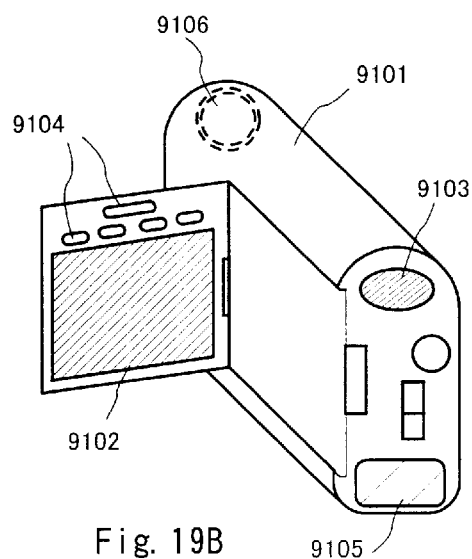

FIG. 19B shows a video camera, which is constructed of the body 9101, a display unit 9102, a sound input unit 9103, operating switches 9104, a battery 9105, and an image receiving unit 9106. The present invention can be applied to the display unit 9102 including an active matrix substrate.

Figure 19C:
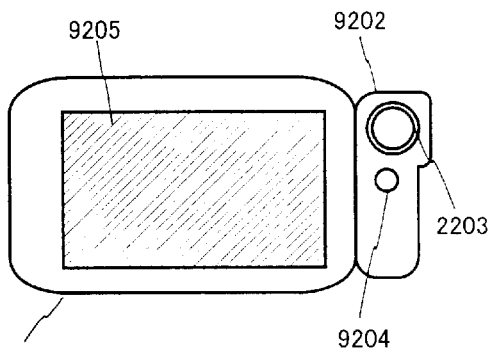

FIG. 19C shows a mobile computer or portable information terminal, which is constructed of the body 9201, a camera unit 9202, an image receiving unit 9203, an operating switch 9204, and a display unit 9205. The present invention can be applied to TFTs which constitute the reading circuit of an image sensor disposed as the image receiving unit 9203, and to the display unit 9205 which includes an active matrix substrate.

Figure 19D:
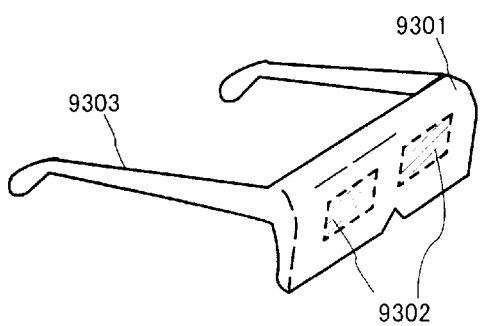

FIG. 19D shows a head-mounted type display, which is constructed of the body 9301, display units 9302, and arms 9303. The present invention can be applied to the display units 9302.

Figure 19E:
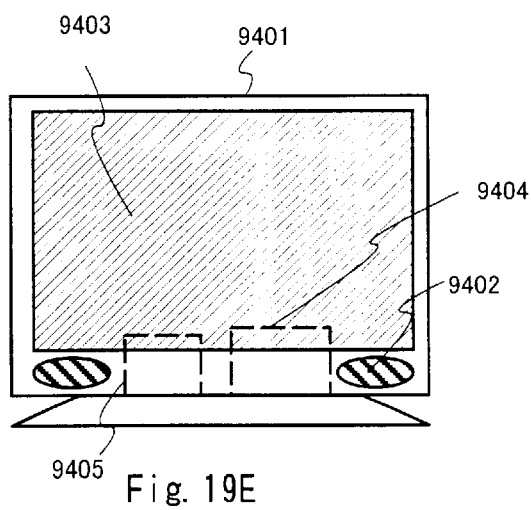

FIG. 19E shows a television receiver, which is constructed of the body 9401, loudspeakers 9402, a display unit 9403, a receiver unit 9404, an amplifier unit 9405, etc. The active matrix type liquid-crystal display device of the present invention can be applied to the display unit 9403.

Figure 19F:
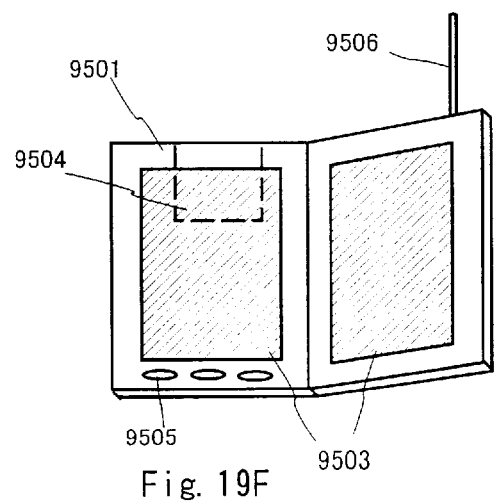

FIG. 19F shows a portable book (electronic book), which is constructed of the body 9501, display units 9502, 9503, a storage medium 9504, operating switches 9505 and an antenna 9506, and which displays data stored in a mini-disc (MD) or DVD and data received by the antenna 9506. The display units 9502, 9503 are of direct-view type, and the present invention can be applied thereto.

Figure 20A:
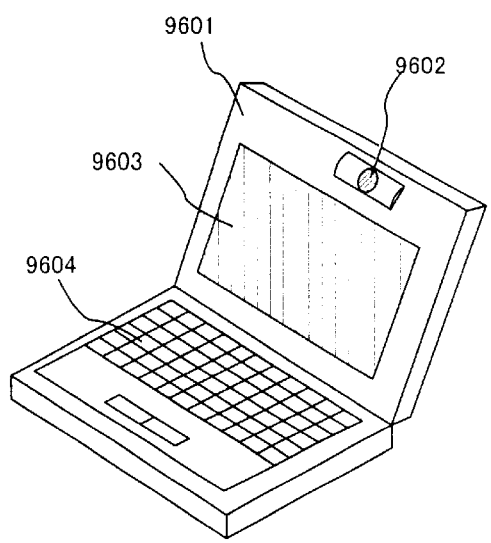
FIGS. 20A through 20C are views each showing an example of an electronic equipment which employs the active matrix type liquid-crystal display device according to the present invention.

FIG. 20A shows a personal computer, which is constructed of the body 9601, an image input unit 9602, a display unit 9603, and a keyboard 9604. The active matrix type liquid-crystal display device of the present invention can be applied to the display unit 9603.

Figure 20B:
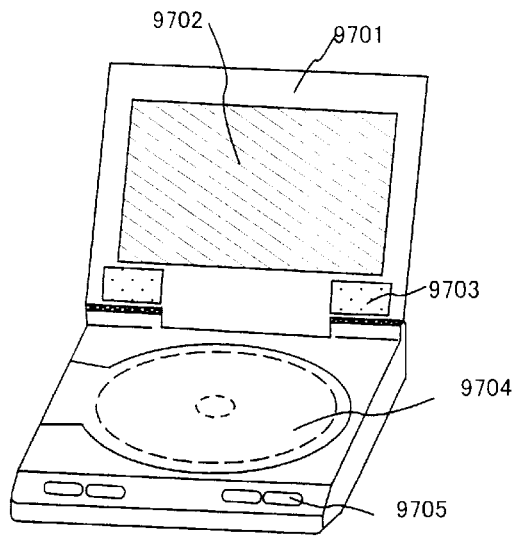

FIG. 20B shows a player which is used for a recording medium (9704) storing programs therein, and which is constructed of the body 9701, a display unit 9702, a loud-speaker unit 9703, and operating switches 9705. By the way, the recording medium 9704 is a DVD (Digital Versatile Disc), a CD (Compact Disc), or the like, and the player is capable of reproducing music, a motion picture, a video game or information obtained through the Internet. The active matrix type liquid-crystal display device of the present invention can be applied to the display unit 9702.

Figure 20C:
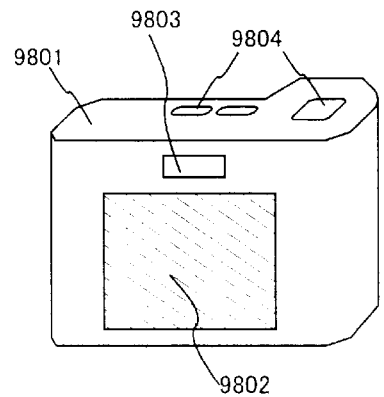

FIG. 20C shows a digital camera, which is constructed of the body 9801, a display unit 9802, a view window 9803, operating switches 9804, and an image receiving unit (not shown). The active matrix type liquid-crystal display device of the present invention can be applied to the display unit 9802.

An active matrix substrate having a pixel structure of IPS mode according to the present invention is formed with signal wiring lines and common electrodes at different layers and is endowed with the pixel structure as shown in FIG. 2, 4, 17 or 18A, whereby the aperture ratio of a display device can be enhanced. Moreover, gate wiring lines are formed of a low-resistance conductive material, whereby a wiring resistance can be made low enough to fabricate the display device whose pixel portion (screen size) is in the 4-inch class or above. Both the Aspects of Performance 1 and 2 are applicable as the constructions of the electrode of the pixel portion.

Further, according to any fabricating process described in each embodiment, the number of photo-masks necessary for fabricating the active matrix substrate can be decreased to five (for an insular semiconductor film pattern, for a gate electrode pattern, for a pattern masking n-channel regions, for a contact hole pattern, and for a wiring line pattern). As a result, the fabricating process can be shortened to contribute to curtailment in a manufacturing cost and enhancement in an available percentage.

What is claimed is:

1. A liquid-crystal display device comprising:
   a semiconductor island, a gate wiring line, a pixel electrode, and a common wiring line formed over a substrate;
   a first insulating layer formed over said semiconductor island, and on which said gate wiring line is formed;
   a signal wiring line formed over said first insulating layer;
   a second insulating layer formed over said first insulating layer, and on which said pixel electrode and said common wiring line are formed; and
   a connecting electrode formed over said second insulating layer, and through which said signal wiring line and said semiconductor island are connected;
   wherein said pixel electrode and said common wiring line are formed so as to generate an electric field substantially parallel to said insulating surface;
   wherein said signal wiring line overlaps said common electrode with said second insulating layer interposed therebetween.

2. A liquid-crystal display device according to claim 1, wherein said second insulating layer is formed of a first insulating film comprising silicon, and a second insulating film comprising an organic resin material.

3. A liquid-crystal display device according to claim 1, wherein said second insulating layer is formed of a first insulating film which is made of a member selected from the group consisting of silicon oxide, silicon nitride and silicon oxynitride, and a second insulating film which is made of a member selected from the group consisting of polyimide, an acrylic resin, polyamide, polyimideamide, and benzocyclobutene.

4. A liquid crystal display device according to claim 1, wherein said liquid-crystal display device is incorporated into an electronic equipment selected from the group consisting of a portable telephone, a video camera, a mobile computer, a portable information terminal, a head-mounted type display, a television receiver, a portable book, a personal computer, a player, and a digital camera.

5. A liquid-crystal display device comprising:
   a thin film transistor formed on an insulating surface, said thin film transistor having a gate electrode formed over a semiconductor layer with a first insulating film therebetween;
   a gate wiring line formed on said first insulating layer;
   a second insulating layer formed over said first insulating layer;
   a common wiring line crossing said gate wiring line with said second insulating layer interposed therebetween;
   a pixel electrode formed over said second insulating layer, said pixel electrode connected to said thin film transistor;
   a signal wiring line formed over said first insulating layer, said signal wiring line being overlapped with said common wiring line with said second insulating layer interposed therebetween; and
   a connecting electrode formed over said second insulating layer, and through which said signal wiring line and said semiconductor layer are connected;
   wherein said pixel electrode and said common wiring line are formed so as to generate an electric field substantially parallel to said insulating surface.

6. A liquid-crystal display device according to claim 5, wherein said second insulating layer is formed of a first insulating film comprising silicon, and a second insulating film comprising an organic resin material.

7. A liquid-crystal display device according to claim 5, wherein said second insulating layer is formed of a first insulating film which is made of a member selected from the group consisting of silicon oxide, silicon nitride and silicon oxynitride, and a second insulating film which is made of a member selected from the group consisting of polyimide, an acrylic resin, polyamide, polyimideamide, and benzocyclobutene.

8. A liquid crystal display device according to claim 5, wherein said liquid-crystal display device is incorporated into an electronic equipment selected from the group consisting of a portable telephone, a video camera, a mobile computer, a portable information terminal, a head-mounted type display, a television receiver, a portable book, a personal computer, a player, and a digital camera.

9. A liquid-crystal display device according to claim 5, wherein said thin film transistor has a multi-gate structure.

10. A liquid-crystal display device having a first substrate and a second substrate, said liquid-crystal display device comprising:

a pixel portion and a driver circuit formed over said first substrate, said pixel portion comprising:

a thin film transistor having a gate electrode formed over a semiconductor layer with a first insulating layer interposed therebetween;

a gate wiring line formed over said first insulating layer;

a second insulating layer formed over said first insulating layer;

a common wiring line crossing said gate wiring line with said second insulating layer interposed therebetween;

a pixel electrode formed over said second insulating layer and connected to said thin film transistor;

a signal wiring line formed over said first insulating layer, said signal wiring line being overlapped with said common wiring line with said second insulating layer interposed therebetween; and a connecting electrode formed over said second insulating layer, and through which said signal wiring line and said semiconductor layer are connected;

wherein said pixel electrode and said common wiring line are formed so as to generate an electric field substantially parallel to a plane of said first substrate, and color filter layers of red, blue and green formed over said second substrate, so as to correspond to each pixel of said pixel portion;

a light shield film formed so as to overlap said thin film transistor, and in which said red color filter layer and said blue color filter layer are stacked; and a light-transmitting conductive film formed on an opposite surface of said second substrate on which said color filter layers are formed.

11. A liquid-crystal display device according to claim 10, wherein said thin film transistor has a multi-gate structure.

12. A liquid-crystal display device according to claim 10, wherein said second insulating layer is formed of a first insulating film comprising silicon, and a second insulating film comprising an organic resin material.

13. A liquid-crystal display device according to claim 10, wherein said second insulating layer is formed of a first insulating film which is made of a member selected from the group consisting of silicon oxide, silicon nitride and silicon oxynitride, and a second insulating film which is made of a member selected from the group consisting of polyimide, an acrylic resin, polyamide, polyimideamide, and benzocyclobutene.

14. A liquid crystal display device according to any of claim 10, wherein said liquid-crystal display device is incorporated into an electronic equipment selected from the group consisting of a portable telephone, a video camera, a mobile computer, a portable information terminal, a head-mounted type display, a television receiver, a portable book, a personal computer, a player, and a digital camera.

15. A method of fabricating a liquid-crystal display device comprising the steps of:

forming a semiconductor island over a substrate;

forming a first insulating layer over said semiconductor island;

forming a gate wiring line and a signal wiring line over said first insulating layer;

forming a second insulating layer over said gate wiring line and said signal wiring line; and forming a pixel electrode, a common wiring line and a connecting electrode for connecting said signal wiring line and said semiconductor island over said second insulating layer, wherein said common wiring line are formed so as to overlap said signal wiring line.

16. A method of fabricating a liquid-crystal display device according to claim 15, wherein said second insulating layer is formed of a first insulating film comprising silicon, and a second insulating film comprising an organic resin material.

17. A method of fabricating a liquid-crystal display device according to claim 15, wherein said second insulating layer is formed of a first insulating film which is made of a member selected from the group consisting of silicon oxide, silicon nitride and silicon oxynitride, and a second insulating film which is made of a member selected from the group consisting of polyimide, an acrylic resin, polyamide, polyimideamide, and benzocyclobutene.

18. A method of fabricating a liquid-crystal display device according to claim 15, wherein said liquid-crystal display device is incorporated into an electronic equipment selected from the group consisting of a portable telephone, a video camera, a mobile computer, a portable information terminal, a head-mounted type display, a television receiver, a portable book, a personal computer, a player, and a digital camera.

19. A method of fabricating a liquid-crystal display device comprising the steps of:

forming a semiconductor island over a substrate;

forming a first insulating layer over said semiconductor island;

forming a gate electrode, a gate wiring line and a signal wiring line over said first insulating layer;

forming a second insulating layer over said gate wiring line and said signal wiring line; and forming a pixel electrode connected to said semiconductor island, a common wiring line, and a connecting electrode for connecting said signal wiring line and said semiconductor island, over said second insulating layer, wherein said common wiring line are formed so as to overlap said signal wiring line.

20. A method of fabricating a liquid-crystal display device according to claim 19, wherein said second insulating layer is formed of a first insulating film comprising silicon, and a second insulating film comprising an organic resin material.

21. A method of fabricating a liquid-crystal display device according to claim 19, wherein said second insulating layer is formed of a first insulating film which is made of a member selected from the group consisting of silicon oxide, silicon nitride and silicon oxynitride, and a second insulating film which is made of a member selected from the group consisting of polyimide, an acrylic resin, polyamide, polyimideamide, and benzocyclobutene.

22. A method of fabricating a liquid-crystal display device according to any one of claim 19, wherein said liquid-crystal display device is incorporated into an electronic equipment selected from the group consisting of a portable telephone, a video camera, a mobile computer, a portable information terminal, a head-mounted type display, a television receiver, a portable book, a personal computer, a player, and a digital camera.

23. A method of fabricating a liquid-crystal display device comprising the steps of:

forming a semiconductor island over a first substrate;

forming a first insulating layer over said semiconductor island;

forming a gate electrode, a gate wiring line and a signal wiring over said first insulating layer;

forming a second insulating layer on said gate wiring line and said signal wiring line;

forming a pixel electrode connected to said semiconductor island, a common wiring line, and a connecting electrode for connecting said signal wiring line and said semiconductor island, over said second insulating layer, wherein said common wiring line are formed so as to overlap said signal wiring line;

forming color filter layers of red, blue and green over a second substrate, each of said color filter layers corresponding to a pixel formed on said first substrate;

forming a light shield film by stacking the red color filter layer and the blue color filter layer so as to overlap said semiconductor island; and forming a light-transmitting conductive film on an opposite surface of said second substrate on which said color filter layers are formed.

24. A method of fabricating a liquid-crystal display device according to claim 23, wherein said second insulating layer is formed of a first insulating film comprising silicon, and a second insulating film comprising an organic resin material.

25. A method of fabricating a liquid-crystal display device according to claim 23, wherein said second insulating layer is formed of a first insulating film which is made of a member selected from the group consisting of silicon oxide, silicon nitride and silicon oxynitride, and a second insulating film which is made of a member selected from the group consisting of polyimide, an acrylic resin, polyamide, polyimideamide, and benzocyclobutene.

26. A method of fabricating a liquid-crystal display device according to claim 23, wherein said liquid-crystal display device is incorporated into an electronic equipment selected from the group consisting of a portable telephone, a video camera, a mobile computer, a portable information terminal, a head-mounted type display, a television receiver, a portable book, a personal computer, a player, and a digital camera.

\* \* \* \* \*